United States Patent
Hayashi et al.

[11] Patent Number: 6,152,521
[45] Date of Patent: Nov. 28, 2000

[54] FRONT BODY STRUCTURE FOR VEHICLE

[75] Inventors: Kiyoshi Hayashi; Masahiro Osumi; Koji Taga; Ichirou Kamimoto; Hiroomi Miyasaka, all of Hiroshima, Japan

[73] Assignee: Mazda Motor Corporation, Hiroshima, Japan

[21] Appl. No.: 09/106,865

[22] Filed: Jun. 30, 1998

[30] Foreign Application Priority Data

Jun. 30, 1997 [JP] Japan ................................ 9-174364
Mar. 25, 1998 [JP] Japan ............................... 10-077466

[51] Int. Cl.$^7$ .................................................. B62D 21/15
[52] U.S. Cl. ..................................... 296/188; 296/203.02
[58] Field of Search .................................... 293/132, 133, 293/154, 155; 296/189, 188, 204, 205, 203.02, 203.04; 280/784, 797, 798

[56] References Cited

U.S. PATENT DOCUMENTS

| | | | |
|---|---|---|---|
| 3,108,836 | 10/1963 | Deckert | 296/204 |
| 3,912,295 | 10/1975 | Eggert, Jr. | |
| 4,133,549 | 1/1979 | Reidelbach et al. | |
| 4,178,028 | 12/1979 | Lura | 293/155 X |
| 4,679,820 | 7/1987 | Srock et al. | 296/188 X |
| 4,974,891 | 12/1990 | Furuta | 293/155 X |
| 5,080,412 | 1/1992 | Stewart et al. | 293/155 |
| 5,314,229 | 5/1994 | Matuzawa et al. | 296/189 |
| 5,378,031 | 1/1995 | Ohno et al. | 293/155 X |
| 5,868,457 | 2/1999 | Kitagawa | 296/188 |
| 5,876,078 | 3/1999 | Miskech et al. | 293/133 |
| 6,003,934 | 12/1999 | Usui | 296/203.02 |

FOREIGN PATENT DOCUMENTS

| | | | |
|---|---|---|---|
| 3144844 | 6/1982 | Germany . | |
| 3822060 | 1/1990 | Germany . | |
| 57-194135 | 11/1982 | Japan | 293/155 |
| 61-287871 | 12/1986 | Japan . | |
| 2-24777 | 2/1990 | Japan . | |
| 4-231268 | 8/1992 | Japan . | |
| 5-305877 | 11/1993 | Japan . | |
| 7-267130 | 10/1995 | Japan . | |
| 8-324454 | 12/1996 | Japan . | |

*Primary Examiner*—D. Glenn Dayoan
*Assistant Examiner*—Paul Chenevert
*Attorney, Agent, or Firm*—Nixon Peabody LLP; Donald R. Studebaker

[57] ABSTRACT

A front body structure for a vehicle has a pair of front side frames of a boxed-type which extend in a lengthwise direction from the front to the back of the vehicle at opposite sides of the front body. The front side frame has a closed rectangular cross section which has an approximately constant height over the length and has a height-to-width ratio gradually decreasing toward a ratio of 1 (one) as the front frame comes closer to the forward end thereof.

21 Claims, 22 Drawing Sheets

FRONT BODY STRUCTURE FOR VEHICLE

BACKGROUND OF THE INVENTION

1. Field of the Invention

The invention relates to a body structure for vehicles, and, more particularly, to a vehicle body structure having a frame.

2. Description of Related Art

Typically, In a known vehicle body structure, a front frame is constructed as a boxed channel as described in, for example, Japanese Unexamined Patent Publication No. 8-324454. This front frame is constructed of a pair of flanged U-channel members with their flanges welded together. The front frame has a front crumple zone formed with transverse beads arranged in a lengthwise direction from the front to the back of the frame which is programmed to collapse and absorb the energy of an impact in the event of a frontal collision.

In general, in the event where an external impact acts on a frame at the front end or the rear end in the lengthwise direction, the frame starts to collapse initially with an impact which is not so great and absorbs the energy of the impact to ease the passenger's feeling of an impact and then continuously and regularly collapses without bending to absorb the significantly strong energy of the impact before it reaches the passengers. In order for the frame to continuously and regularly collapse, if having a rectangular cross-section, the frame is typically programmed such that all four walls collapse bellows-fashion at regular pitches peculiar thereto in the lengthwise direction and each adjacent walls are deformable in different shapes, namely concave and convex, as viewed in a same cross-sectional plane.

Conventional type of front frame, to which a front bumper is attached, is formed with a variety of beads so as to collapse in a programmed fashion in the event where an impact acts on the frame through the bumper upon an occurrence of a frontal collision. As is described in, for example, Japanese Unexamined Patent Publications Nos. 61-287871, 5-305877 and Japanese Unexamined Utility Model Publication No. 2-24777, a frame has a variety of beads arranged in parallel in the lengthwise direction programmed to cause lengthwise collapse of the frame with maintaining a relatively large yield strength. Further, as is described in, for example, Japanese Unexamined Patent Publication No. 4-231268, a frame is constructed of a boxed channel member, each adjacent walls being formed with different beads, such as concave and convex, as viewed in a same cross-sectional plane. This type of front frame collapses initially at the beads in the event of a frontal collision so as to control and lower an initial maximum yield strength. In addition, as is described in, for example, Japanese Unexamined Patent Publication No. 8-324454, a frame is formed with beads contributory to maintaining a relatively large yield strength during a collapse and beads contributory to lowering the initial maximum yield strength.

In order to provide a rigid structural foundation against frontal collision for a vehicle body and to provide a solid anchorage for an engine and a suspension system, it is desirable for a front frame having high cross-sectional stiffness to have a rectangular cross-section, as described in, for example, U.S. Pat. No. 3,912,295. A box-shaped front frame of some sort constructed of a pair of flanged U-channel members with their flanges welded together, the frame has a rectangular cross section uniform almost over the entire length and the flanges are transversely off in the lengthwise direction, as described in, for example, U.S. Pat. No. 4,133,549. The prior art front frame is typically provided with end flanges bent laterally to which a front bumper is secured.

Vehicle body is possibly hit an impact in various directions, for example in a lengthwise direction from front or from behind in the event of a frontal or a rear-end collision, respectively, in a slantwise direction from front or from behind in the event of what is called an offset collision, and in a transverse direction in the event of a lateral collision. In the case where the front body is constructed of a front frame, the front frame is essential to be rigid against impacts acting thereon in different directions. The front frame, however, has somewhat conflict demands for stiffness at different lengthwise areas thereof. For example, because of a solid anchorage for a suspension system, the front frame at its rear area must be stiff against bending due to external force vertically acting thereon through the suspension system and is accordingly essential to have high cross-sectional stiffness, in particular, in the transverse direction. On the other hand, the front frame at its front area must withstand a collision impact acting thereof in various directions. However, if the front frame at its front area causes bending deformation due to a frontal offset collision, it is hard for the front frame at its front area to absorb the energy of a frontal collision impact through contract or collapse at the beads. Accordingly, the front frame at its front area is essential to have high cross-sectional stiffness, in particular, in the vertical direction.

As was previously described, impacts acting on the front bumper during a frontal collision is not always directed in parallel to the front frame. The front bumper secured to the front frame is bent at either one end first by such a slantwise impact in the initial stage of a collision and deflects the impact toward the end of the front frame with an effect of blocking transmission of the impact to the front frame. Consequently, even though the front frame has a variety of beads, it can not only crash as programmed but perform functions such as lowering an initial impact and absorbing the energy of an impact in the event of a collision.

Further, if increasing the cross-sectional area of the front frame to provide a large cross-sectional stiffness, an increase in weight of the vehicle body is produced, which is always against a demand for a lightweight body.

SUMMARY OF THE INVENTION

It is an objective of the invention to provide a front body structure meeting conflict demands for stiffness of a front frame at its front area which receives an impact upon an occurrence of a collision and its rear area which solidly anchors a suspension system.

The foregoing object of the present invention is achieved by providing a front body structure having a boxed-type of front frame extending in a lengthwise direction from the front to the back of the vehicle at each side of a front body of the vehicle.

According to an embodiment of the invention, the front frame has a closed rectangular cross section having a height-to-width ratio (H/W) decreasing toward one (H/W =1) as the front frame comes closer to the forward end thereof. The front frame has a height substantially constant from the rear end to the forward end thereof and a width increasing as the front frame comes closer toward the forward end. The front frame may have a kick-down section at rear part thereof which is reinforced by a gusset.

Front frame has impact absorbing front means disposed near the front end for relieving a longitudinal external impact applied to a front end of the front body and rear reinforcing means disposed in rear part of the front frame for preventing a bend of the front frame due to a longitudinal external impact. The impact absorbing front means comprises a continuous bead surrounding entire wall sections of the front frame and a ridge-shaped bead formed in one of each adjacent wall sections and a groove-shaped bead formed in another of the adjacent wall sections.

According to another embodiment of the invention, the front frame is provided with rigid reinforcement means for mounting a front bumper to the front frame. The rigid reinforcement means is disposed within and secured to the front frame at the front part before the impact absorbing front means such as a continuous bead comprising a ridge-shaped bead formed in one of each adjacent the wall sections and a groove-shaped bead formed in another of each adjacent wall sections. Since the front bumper is mounted to the front frame through the rigid reinforcement means, the energy of an impact applied to the front bumper is transmitted directly and securely to the impact absorbing front means through the rigid reinforcement means in the event where the vehicle is hit in the lengthwise direction or even in a slantwise direction upon an occurrence of an offset collision. This front body structure yields a decrease in maximum withstanding impact force of the front frame against an initial collision.

Front frame may have another bead means provided in at least one of the vertical wall sections behind the first bead means and between upper and lower margins of the vertical wall section of the front frame for providing an increase in average withstanding impact force against a collapse. The second bead means comprises a plurality of beads or alternations of a ridge-shaped bead and a groove-shaped bead arranged at specified crushing pitches in the lengthwise direction. Each bead is comprised of a ridge-shaped bead formed in one of the vertical wall sections and a groove-shaped bead formed in another one of the vertical wall sections. The vertical height of each margin is approximately equal to a half of the specified crushing pitch.

With the front body structure of the invention, even in the event of an offset collision where the energy of an impact is applied to the front body in a slantwise direction, while the front frame is easily and securely collapsed at its front end section by the energy of the impact, it bears external force applied to its rear end section by a suspension system solidly anchored to the front frame at the rear end section. In this way, the front body structure satisfies conflict demands for stiffness of the front frame. Further the front side frame with the continuous bead securely collapses at the continuous bead when it is given a longitudinal external impact. That is, the front frame ensures a decrease in maximum withstanding impact force against an initial collapse. The front frame with the rear part reinforced by a gusset is prevented from being bent at the rear part, so as to bear an external impact acting thereon in the lengthwise direction, as a result of which the front frame securely cause a collapse in the lengthwise direction.

BRIEF DESCRIPTION OF THE DRAWINGS

The foregoing and other objects and features of the present invention will be clearly understood from the following detailed description of preferred embodiments when read in conjunction with the accompanying drawings wherein the same or similar members are denoted by the same reference numerals and members in which.

DETAILED DESCRIPTION OF THE EMBODIMENTS

Figure 1:
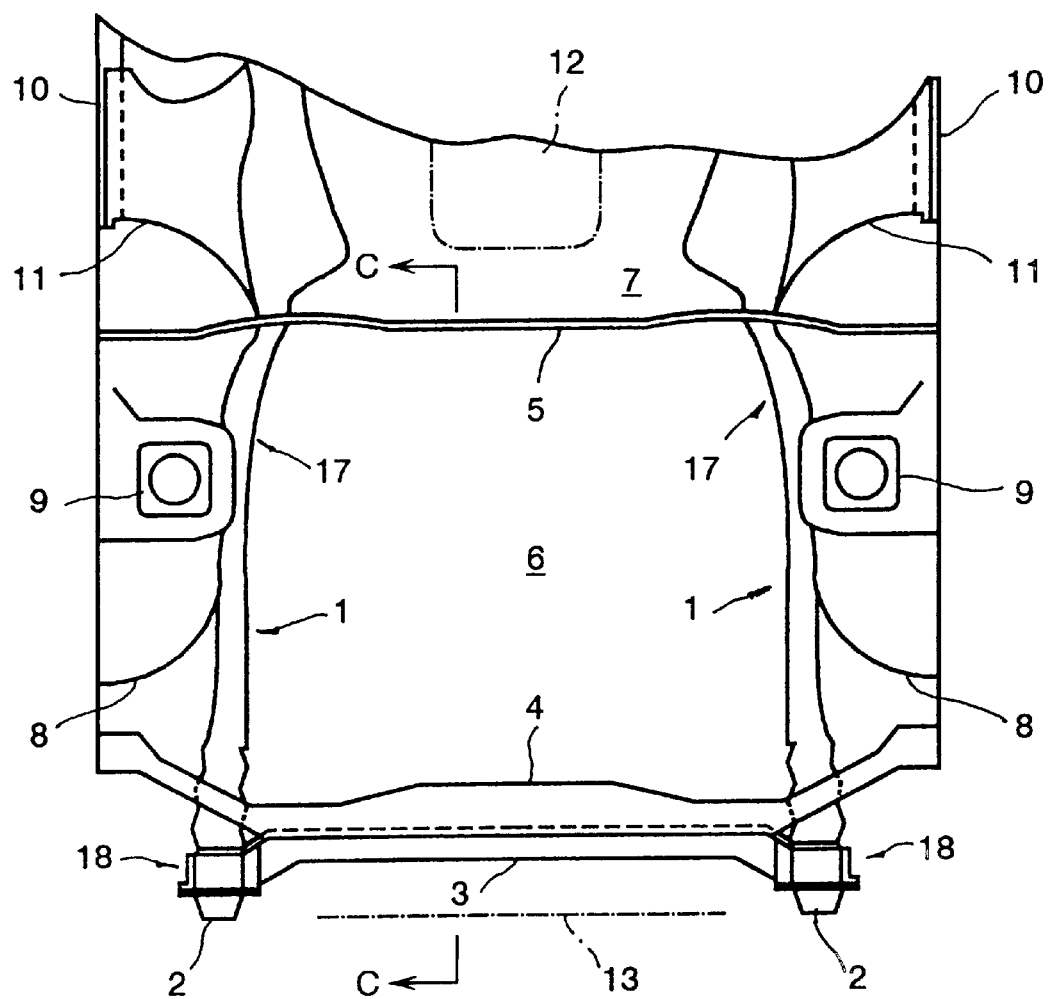
FIG. 1 is a schematic plan view of a front body structure in accordance with an embodiment of the invention.

Referring to the drawings in detail and, in particular, to FIG. 1 showing a front body structure in accordance with an embodiment of the invention, the front body has a pair of front side frames 1 transversely separated as a front frame member each of which is provided with a crushable box 2 attached to the front end thereof. The front side frames 1 at their front parts are connected by a cross member 3. The front body includes an upper shroud 4 transversely extending above the cross member 4 and a dash panel 5 attached to and transversely crossing over the front side frames 1. A space defined in front of the dash panel 5 between and by the front side frames 1 is an engine compartment 6 and a space behind the dash panel 5 between and by the front side frames 1 is a passenger compartment 7. The vehicle body at each front side is provided with a wheel housing 8 and a suspension tower 9 anchored by a suspension cross member (which will be described later) which is secured to the front side frame 1. A front wheel is supported by the suspension tower 9 and covered by the wheel housing 8. A torque box 11 made of a panel member in a cylindrical fashion is disposed between and secured to the front side frame 1 and a side sill 10 on each side of the passenger compartment 7 and is laid to overlap the side sill at the outer end portion thereof. The torque box 11 thus constructed serves as a reinforcement for providing an increase in withstanding rocking motion of the front side frame about an transversal axis at the rear frame part 17 of the front side frame 1. The front body is provided with a tunnel 12 under a floor of the passenger compartment 7 and a front bumper 13.

Figure 2:
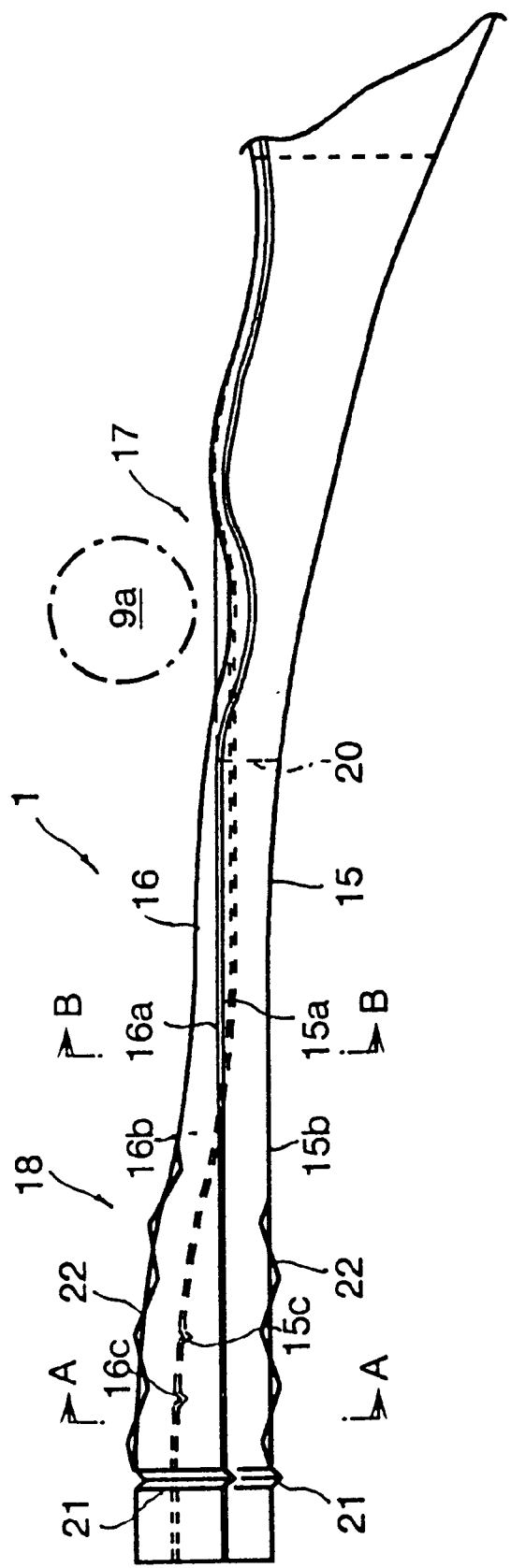
FIG. 2 is an enlarged plan view of a front side frame of the front body structure.
Figure 3:
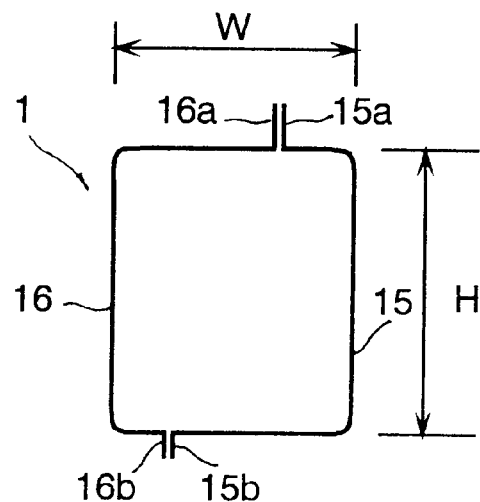
FIG. 3 is a front view of a cross section taken along line A—A of FIG. 2.
Figure 4:
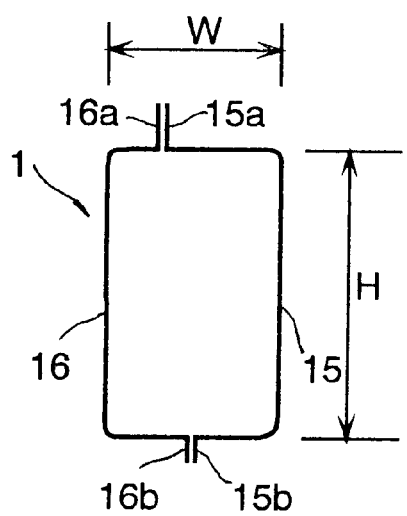
FIG. 4 is a front view of a cross section taken along line B—B of FIG. 2.

As shown in detail in FIGS. 2 through 4, each front side frame 1 is of a boxed channel type which has a closed rectangular cross section and is constructed of a pair of, or inner and outer, flanged U-channel inner and outer members 15 and 16 with their flanges welded together. Each flanged U-channel member 15, 16 is pressed from a steel plate. The front side frame 1 is differed in cross section between a rear half frame part 17 by which a suspension 9a is supported and a front half frame part 18. Specifically, the rear half frame part 17 is shaped to have a rectangular cross section which has a vertical height longer than a transverse width, and the front half frame part 18 is shaped to have a cross section gradually varying from a rectangle nearly to a square toward the forward end of the vehicle body. In other words, the height-to-width ratio H/W of the cross section approaches 1 (one) as the cross section comes closer to the forward end of the vehicle body. In more detail, the cross section of the front side frame 1 at the forward extremity of the rear frame part 17 shown in FIG. 4 has a transverse width W of, for example, 3 cm and a vertical height H of, for example, 6 cm, i.e. a height-to-width ratio H/W of 2, and the cross section of the front side frame 1 near the forward extremity of the front frame part 18 shown in FIG. 3 has a transverse width W of, for example, 5 cm and a vertical height H of, for example, 6 cm, i.e. a height-to-width ratio H/W of 1.2. In this instance, the front side frame 1 has the vertical height H approximately equal over the front and rear frame parts 18 and 17 and the transverse width W gradually increasing laterally outward as it comes closer to the forward end of the vehicle body. Accordingly, as seen in FIG. 1, the more the front side frame 1 comes closer to the forward end of the vehicle body, the more it juts laterally out.

Jointed flange lines change their crosswise positions in the lengthwise direction. Specifically, upper flanges 15a and 16a of the inner and outer U-channel members 15 and 16 extend straight between the front end and the forward extremity of the rear frame part 17, and under flanges 15b and 16b of the inner and outer U-channel members 15 and 16 are gradually off outward between the front end and the forward extremity of the rear frame part 17 as they come closer to the forward end of the vehicle body.

Front side frame 1 constructed as above provides, on one hand, an increase in withstanding rocking motion of the rear frame part 17 about an transversal axis which is caused by an impact transmitted through the suspension 9a. On the other hand, it is hard to bend but easy to collapse or buckle upon an occurrence of a frontal collision or a frontal off-set collision, absorbing the energy of an impact of the collision. In addition, the front side frame 1 has an optimized cross section at each longitudinal points, which is desirable to lighten the front side frame 1. Further, the front side frame 1 changes the position of the center of gravity as the cross section changes in shape.

Figure 5:
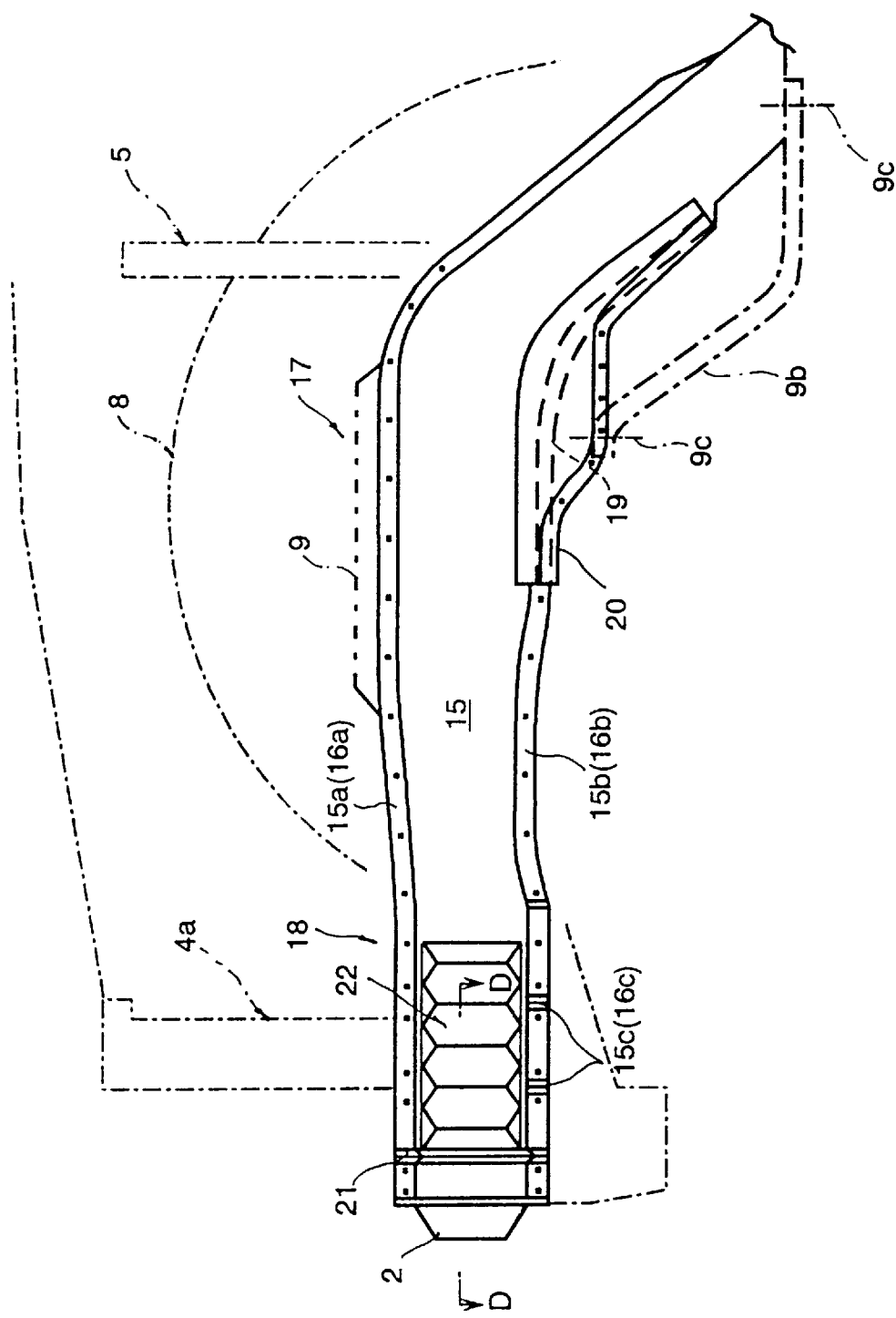
FIG. 5 is an enlarged view of part of the front body structure as viewed along line C—C of FIG. 1.

Referring to FIGS. 2 and 5, the front side frame 1 is bent upward from one side of the dash panel 5 on the passenger compartment 7 to another side of the dash panel 5 on the engine compartment 6. A gusset 20 is welded, or otherwise secured, to the rear frame part 17 and laid to overlap with a kick-down section 19 of the front side frame 1. A suspension cross member 9b at its ends 9c is bolted, or otherwise secured, to the gusset 20 and the front side frame 1 and supports the suspension 9a. Vertical external force transmitted through the suspension 9a is received by part of the front side frame 1 where the gusset 20 is incorporated. The front side frame 1 incorporating the gusset 20 provides a further increase in withstanding rocking motion of the rear frame part 17 about an transversal axis which is caused by vertical external force acting thereon and prevents a decline in stiffness against bending thereof due to the rear frame part 17 having a vertically rectangular cross section. A part shown by a label 4a in FIG. 5 is a radiator held by the upper shroud 4.

Figure 6:
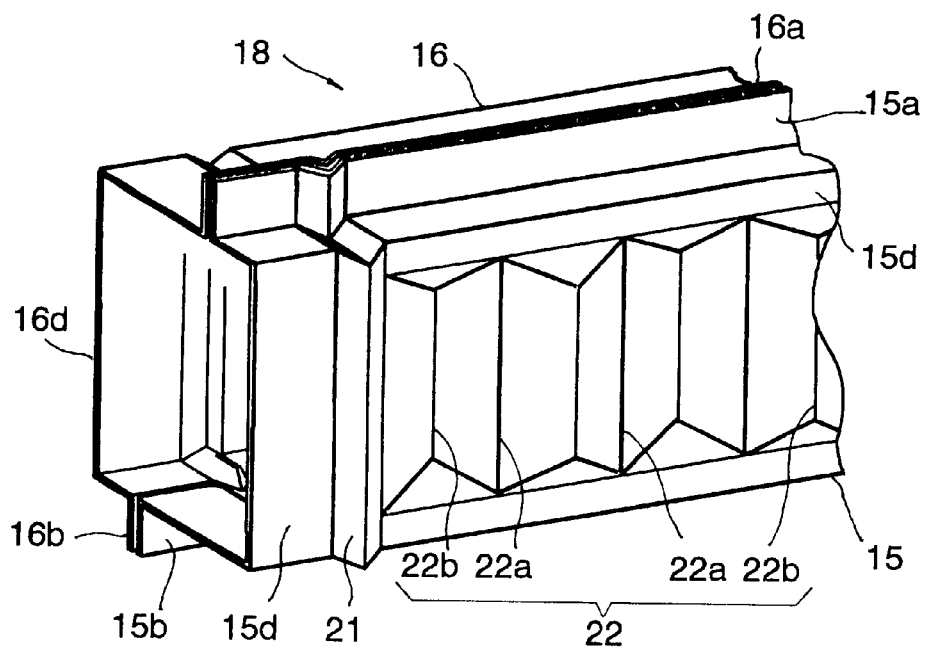
FIG. 6 is a perspective view of front part of the front side frame.
Figure 7:
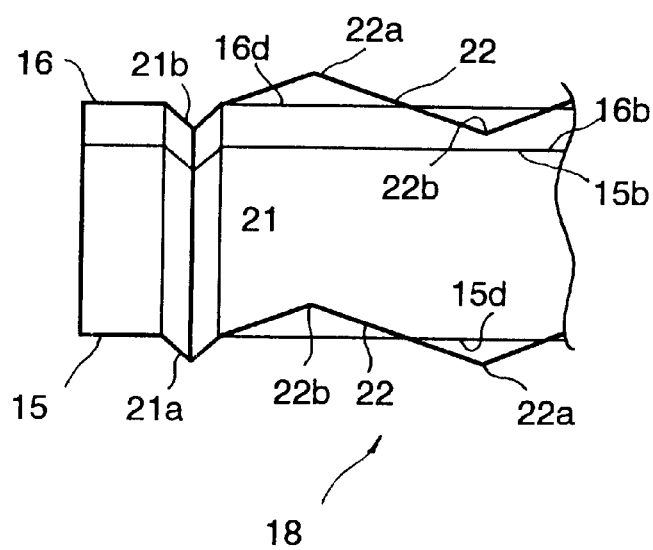
FIG. 7 is a cross-sectional view of the part of the front body structure taken along line D—D of FIG. 5.

Referring to FIGS. 5 through 7, a front half 18 of the front side frame 1 is formed with a first continuous bead 21 and second beads 22 as impact absorbing means which are arranged in a specified extent of the front frame part 18 thereof. Specifically, the front side frame 1 has the first continuous bead 21 disposed in close proximity to the front end thereof and a plurality of second beads 22 disposed after the first continuous bead 21. The first continuous bead 21 is comprised of mating halves, namely a ridge-shaped bead 21a formed in the entire wall sections of the U-channel outer member 15 and a groove-shaped bead 21b formed in the entire wall sections of the U-channel outer member 16. The second beads 22 are comprised of alternations of a ridge-shaped bead 22a and a groove-shaped bead 22b formed in a vertical side wall section 15d, 16d of each U-channel member 15, 16 and each second bead 22 is comprised of mating halves, namely a ridge-shaped bead 22a in one U-channel member and a groove-shaped bead 22b in another U-channel member. As seen in FIG. 5, the under flanges 15b and 16b at a position corresponding to every other bead 22 are formed with beads, each of which is comprised of mating halves, namely a ridge-shaped bead 15c in one under flange 15b and a groove-shaped bead 16c in another under flange 16b. This bead structure in bellows fashion is programmed to permit the front side frame 1 including the flanges 15a, 15b, 16a and 16b to securely and uniformly collapse in the lengthwise direction with a collapse of the first continuous bead 21 as a start and thereby to absorb the energy of an impact upon an occurrence of a frontal collision.

Crushable box 2, which is provided by press-forming a steel plate approximately bowl-fashion, collapses even with the energy of a light impact to absorb it upon an occurrence of a frontal collision before it reaches the front side frame 1.

While the front side frame 1 described above is provided with both first and second beads 21 and 22, however, it is not always necessary for the front side frame 1 to have the first continuous bead 21.

Figure 8:
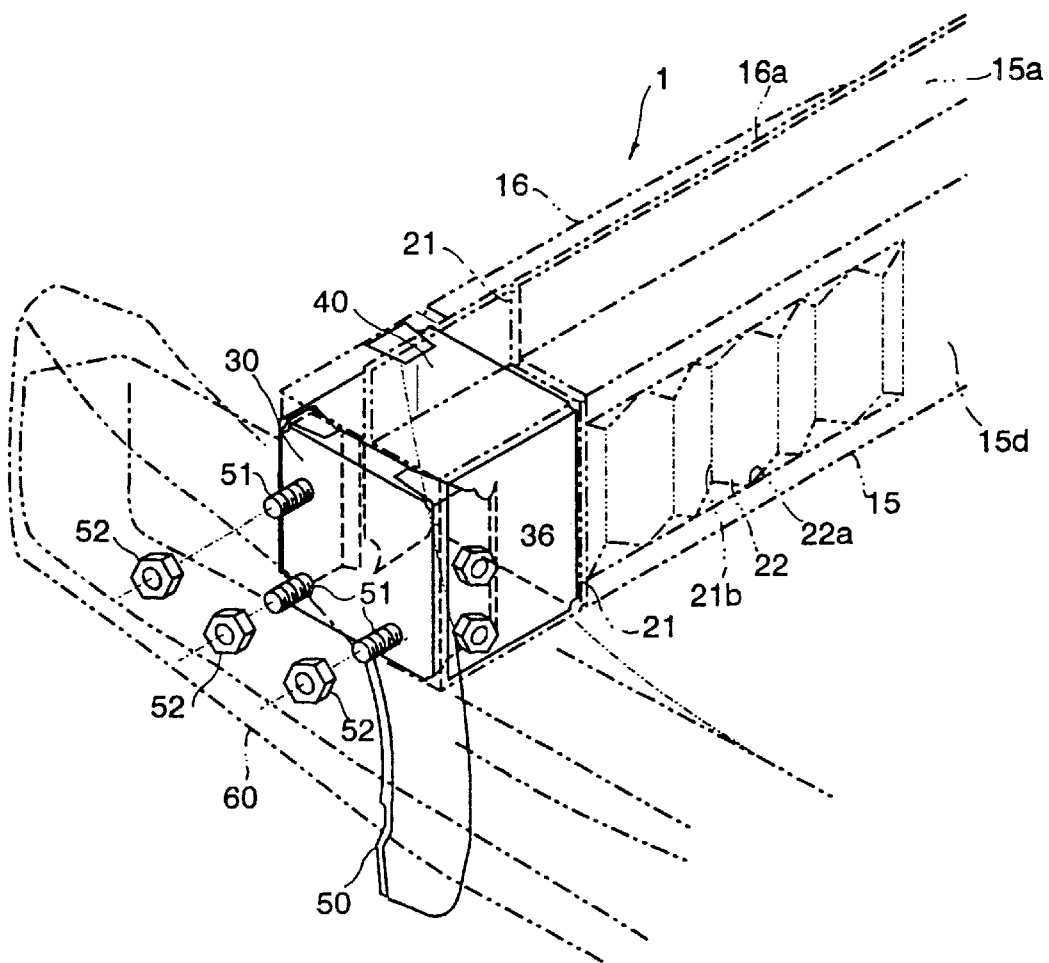
FIG. 8 is a perspective view of a front body structure in accordance with another embodiment of the invention.
Figure 9:
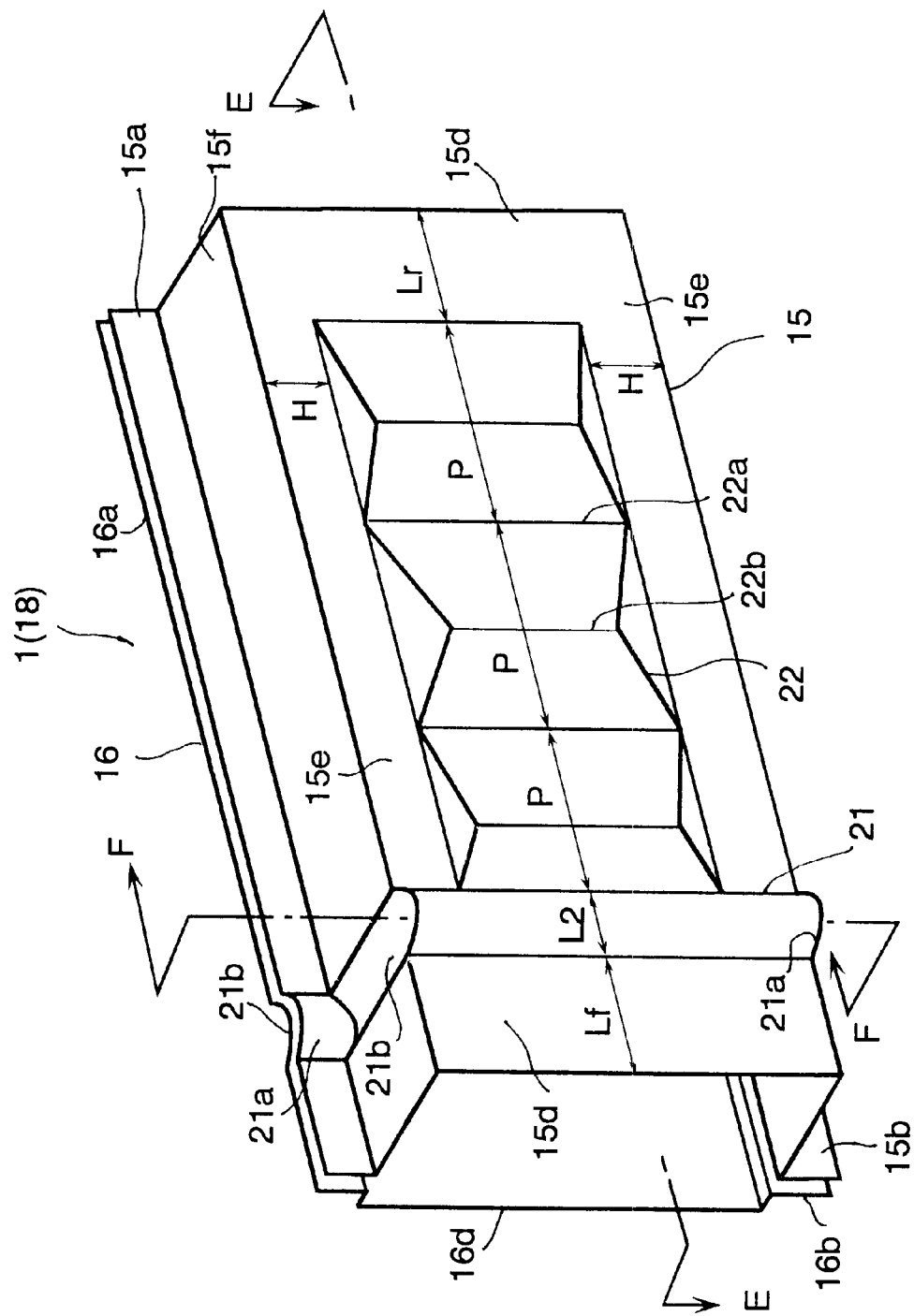
FIG. 9 is a perspective view of a front side frame of the front body structure shown in FIG. 8.
Figure 10:
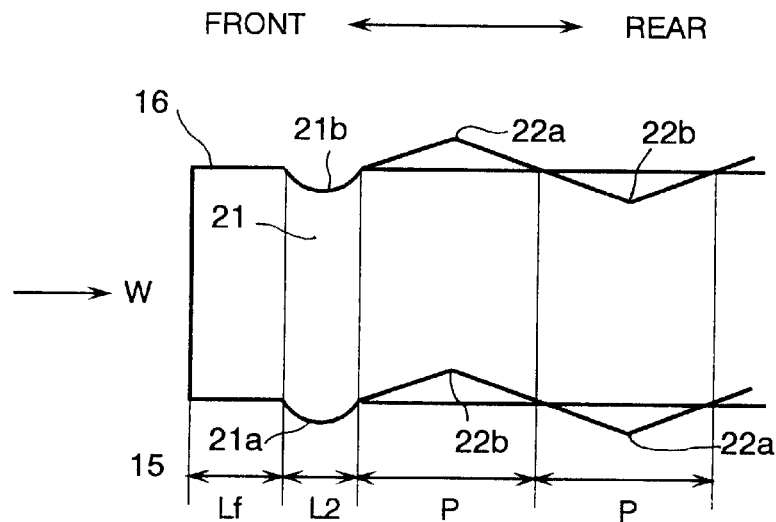
FIG. 10 is a cross-sectional view of FIG. 9 taken along line E—E.

FIGS. 8 through 10 show a front body structure in accordance with another embodiment of the invention which is suitable to attach a front bumper to a front side frame similar in structure to that shown in FIGS. 5 through 7. As shown in FIG. 8, a front side frame 1 has a closed rectangular cross section and is constructed of a pair of, or inner and outer, flanged U-channel members 15 and 16 with their flanges welded together. Each flanged U-channel member 15, 16 is pressed from a steel plate. The front side frame 1 is formed with first and second beads 21 and 22 in a specified extent thereof. Specifically, the front side frame 1 has the first continuous bead 21 having a circular-arcuate cross section and disposed in close proximity to the front end thereof and a plurality of second beads 22 disposed after the first continuous bead 21. The first continuous bead 21 is comprised of vertical convex beads 21a formed in the vertical side wall section 15d and flanges 1 Sa and 15b of the U-channel inner member 15 and vertical concave beads 21b formed in the vertical side wall section 16d and flanges 16a and 16b of the U-channel outer member 16. However, the first continuous bead mean 21 of the U-channel inner member 15 includes horizontal concave beads 21b in upper and under wall sections 15f between the convex beads 21a, and the first continuous bead 21 of the U-channel outer member 16 includes horizontal convex beads 21a in the upper and lower wall sections 16f between the concave beads 21b.

Second beads 22 are comprised of alternations of a vertical ridge-shaped bead 22a and a vertical groove-shaped bead 22b formed at a pitch 2P in a vertical side wall section 15d, 16d of each U-channel member 15, 16 and each second V-shaped bead 22 is comprised of a vertical ridge-shaped bead 22a in one U-channel member and a vertical groove-shaped bead 22b in another U-channel member, arranged at a pitch P. The front side frame 1 is provided with front and rear reinforcement members 30 and 40 disposed separately from each other before the first bead 21 in the interior thereof. These reinforcement members 30 and 40 serve as a reinforcement for preventing the cross section of the front side frame 1 from getting out of its shape upon an occurrence of a collision.

Figure 11:
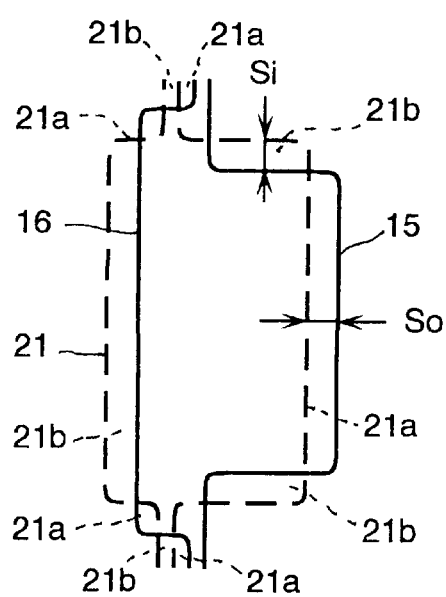
FIG. 11 is a cross-sectional view of FIG. 9 taken along line F—F.

As shown in FIGS. 9 through 11, the second beads 22 are in an area defined between upper and lower margins 15e. The vertical height H of each margin 15e is approximately equal to a half of a crushing pitch P of the front side frame 1. Crushing pitch P of a frame is a factor peculiar to the frame determined according to the shape of its cross section, the quality and thickness of a material of the frame. For a detailed description of a representative example of such a "crushing pitch P," reference may be had to pages 243–270, "DYNAMIC PROGRESSIVE BUCKLING OF CIRCULAR AND SQUARE TUBES", International Journal of Impact Engineering Vol. 4, No. 4, published in United Kingdom, 1986. The longitudinal position of the first continuous bead 21 is apart by a distance Lf (which is an integral multiple of P/2) from the front end of the front half frame part 18, and the longitudinal position of the rear end of second bead 21 is apart by a distance Lr (which is an integral multiple of P/2) from the rear end of the front half frame part 18. The first continuous bead 21 has a width L2 in the longitudinal direction sufficiently smaller than the crushing pitch P, and each bead has a depth Si or a height So substantially equal to the depth Si.

Figure 12:
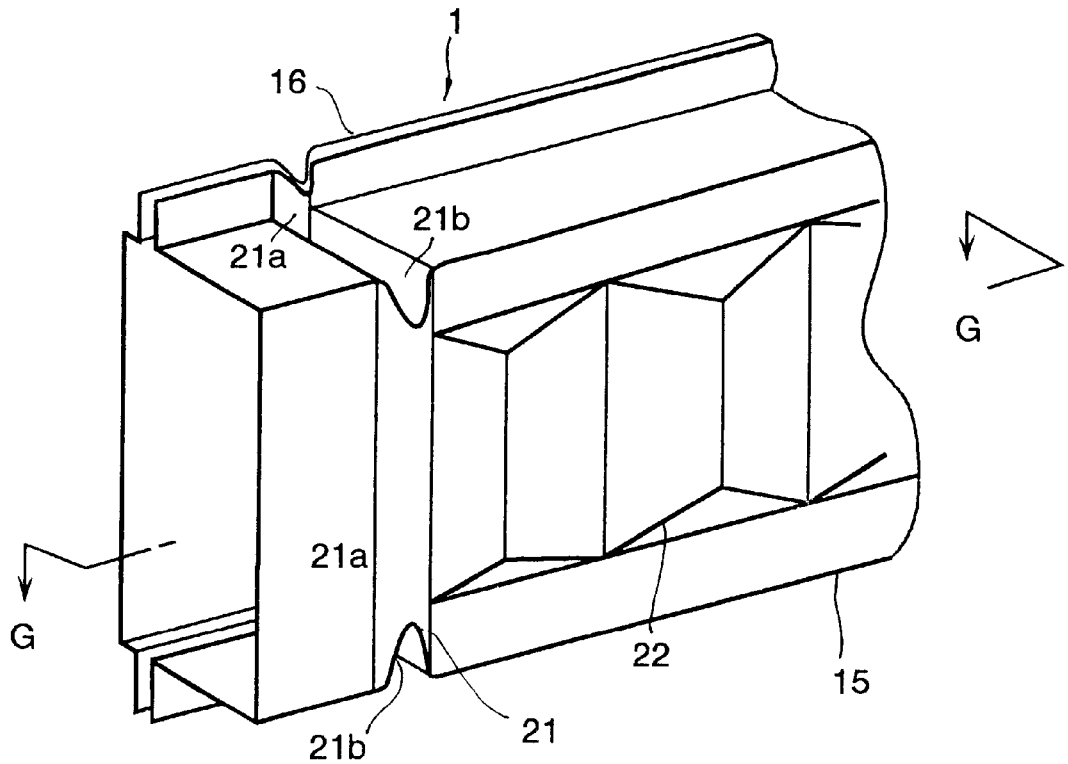
FIG. 12 is an illustration showing deformation of the front side frame.
Figure 13:
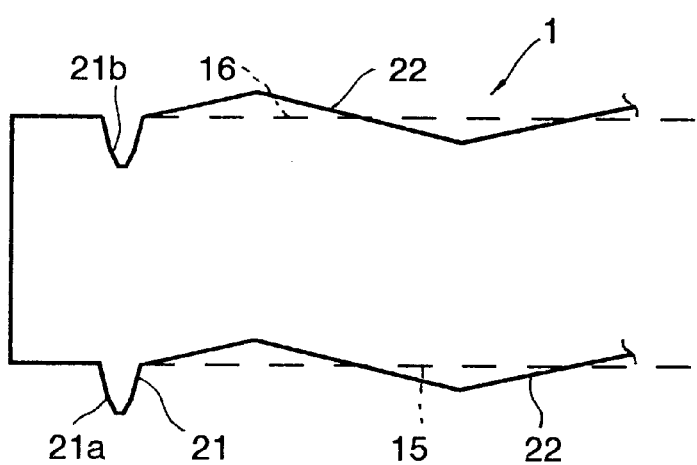
FIG. 13 is a cross-sectional view of FIG. 12 taken along line G—G.
Figure 14:
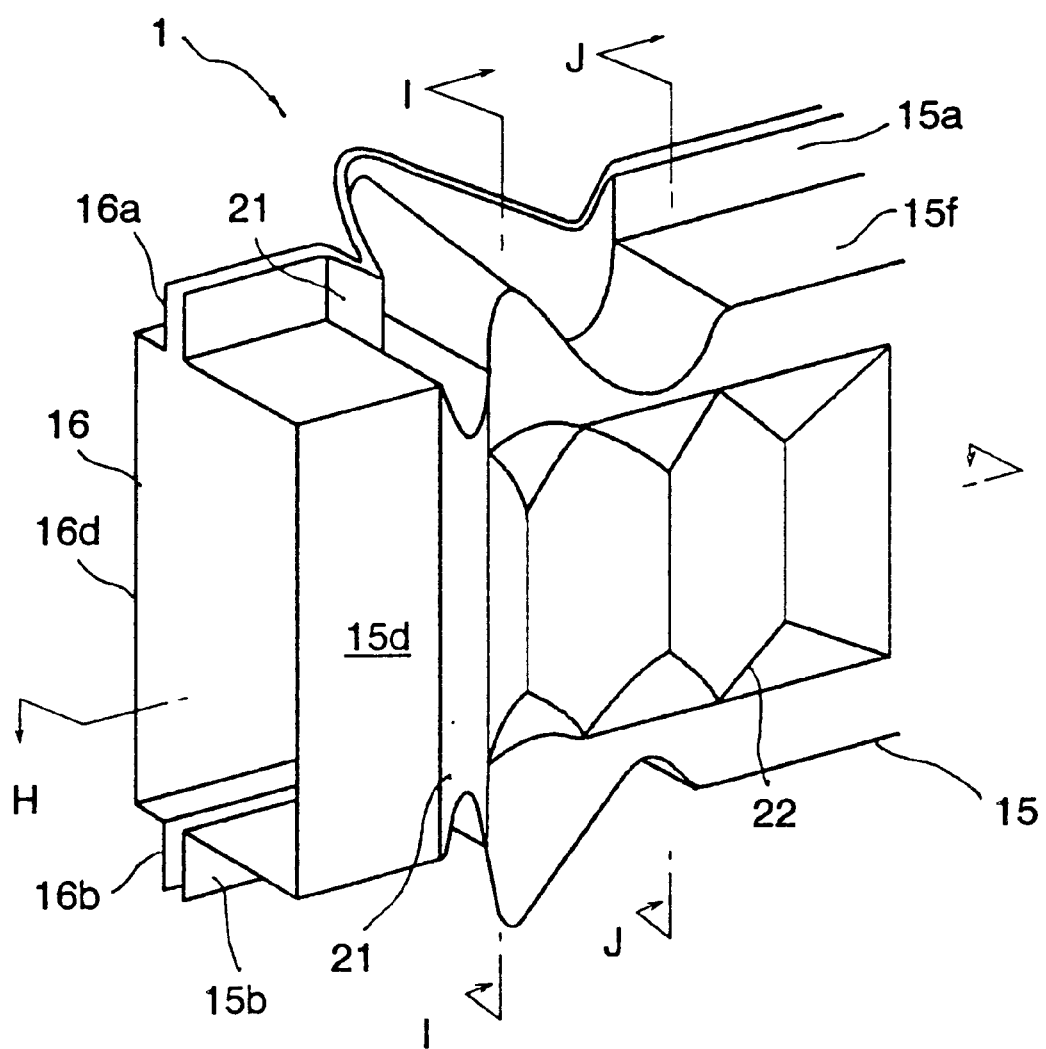
FIG. 14 is an illustration showing further deformation of the front side frame.
Figure 15:
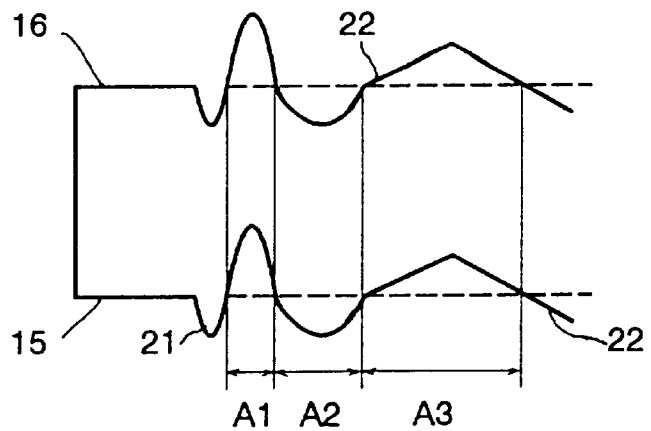
FIG. 15 is a cross-sectional view of FIG. 14 taken along line H—H.
Figure 16:
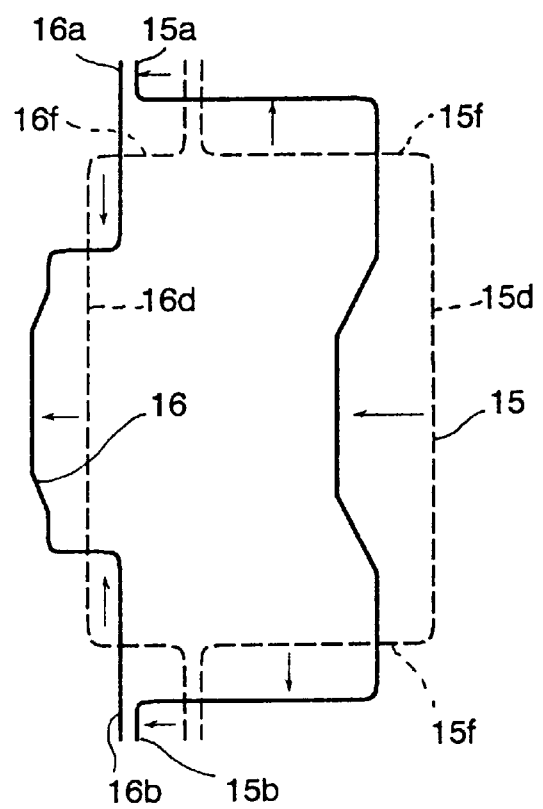
FIG. 16 is a cross-sectional view of FIG. 14 taken along line I—I.
Figure 17:
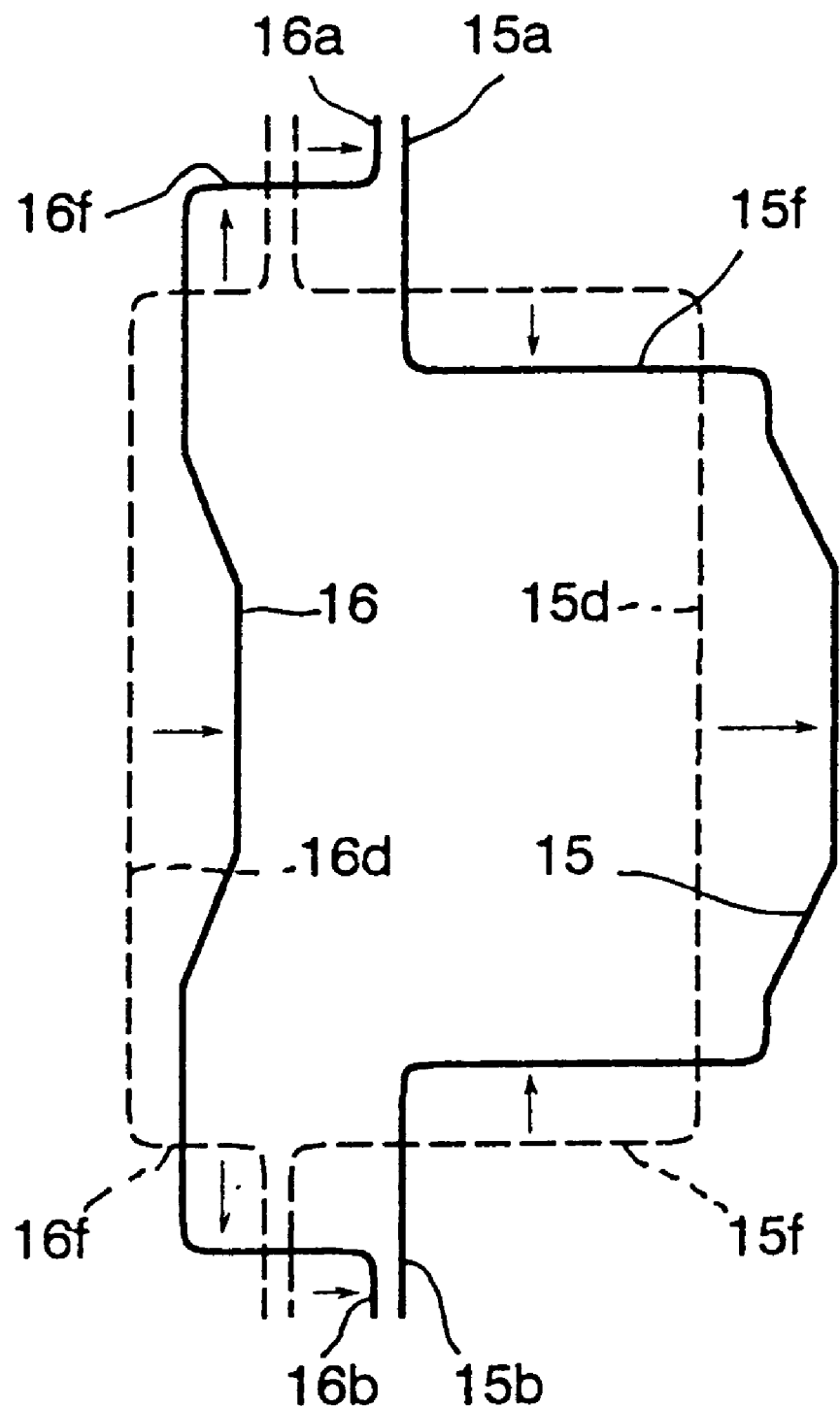
FIG. 17 is a cross-sectional view of FIG. 14 taken along line J—J.

This bead structure in bellows fashion is programmed to permit the front side frame 1 to securely and uniformly collapse in the lengthwise direction with a collapse of the first continuous bead 21 as a start and thereby to absorb the energy of a longitudinal external impact. That is, in the event where a longitudinal external impact W is applied to the vehicle body due to a frontal collision as shown in FIG. 10, the section of the front side frame 1 where the first continuous bead 21 is provided collapses initially. Specifically, the concave bead 21b collapses inward, and the convex bead 21a collapses outward as shown in FIGS. 12 and 13. With a collapse of the first continuous bead 21 as a start, the section where the second beads 22 are provided collapses in the lengthwise direction. Specifically, as shown in FIGS. 14 through 17, the side wall sections 15d and 16d and flanges 15a, 15b and 16a, 16b collapse outward at the ridge-shaped beads 22a and the upper and lower wall sections 15f and 16f, however, collapse inward at the ridge-shaped beads 22a. Contrary, the side wall sections 15d and 16d and flanges 15a, 15b and 16a, 16b collapse inward at the grooveshaped beads 22b and the upper and lower wall sections 15f and 16f, however, collapse outward at the groove-shaped beads 22a.

Figure 18:
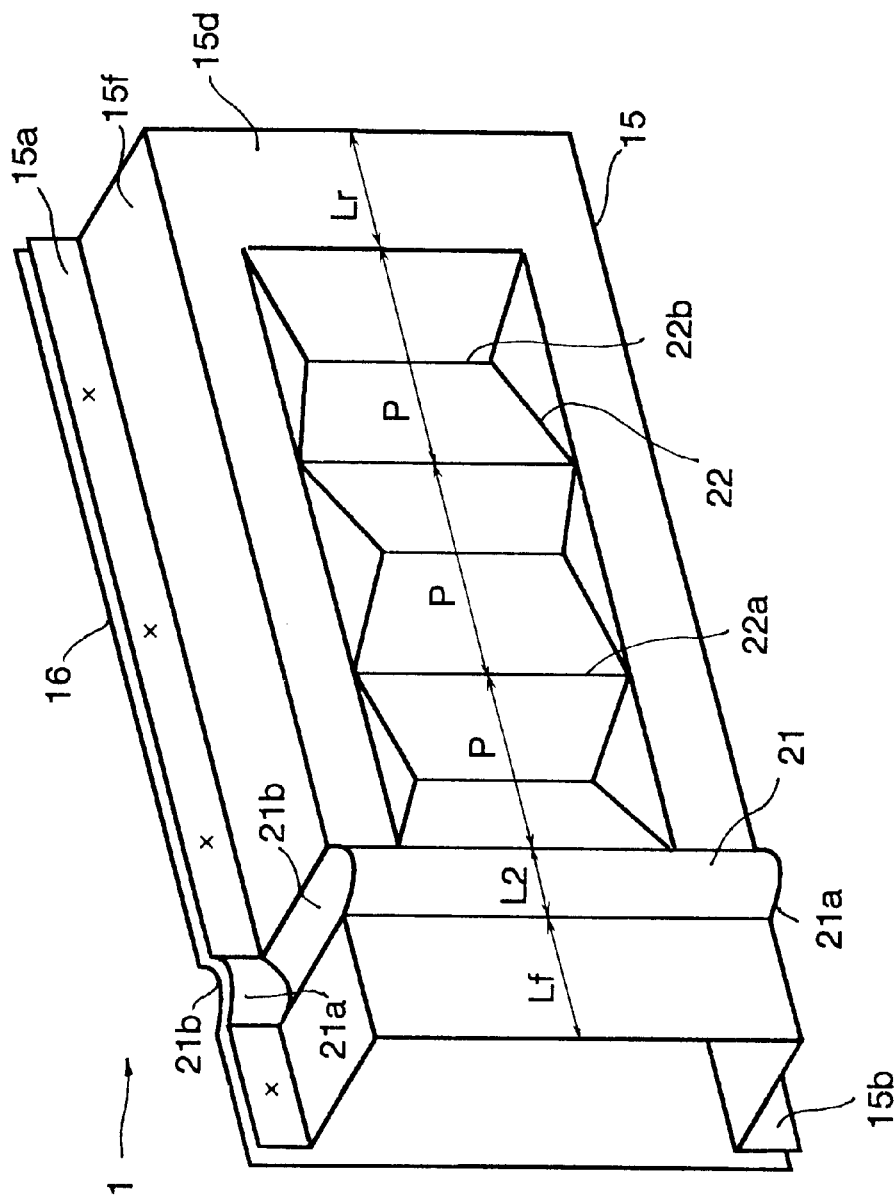
FIG. 18 is a perspective view of a variation of the front side frame of the front body structure shown in FIG. 8.
Figure 19:
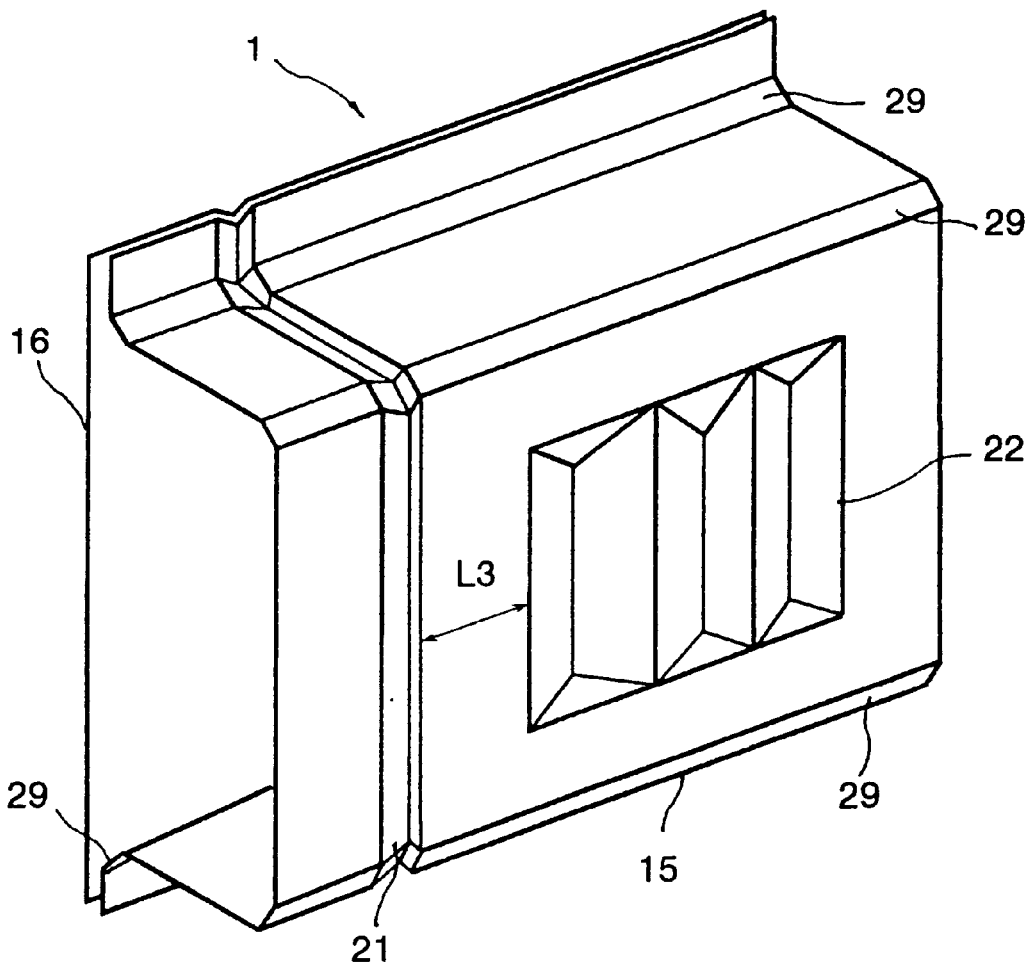
FIG. 19 is a perspective view of another variation of the front side frame of the front body structure shown in FIG. 8.

Front side frame 1 may be of a boxed U-channel type consisting of a flanged U-channel member and a flat plate member welded to the flanges as shown in FIG. 18. Further, the front side frame 1 may be formed with a chamfered comer 29 between each adjacent wall sections and/or provided with a margin 15e of a distance L3 before the section where the second beads 22 are provided as shown in FIG. 19.

While the boxed channel type of frame is generally hard to collapse at comers, the front side frame 1 of a boxed type or a boxed-channel type having the first continuous bead 21 surrounding entirely the wall sections is easily collapsible even at comers. This provides sufficiently low withstanding impact force against an initial collapse due to a longitudinal external impact.

Figure 20:
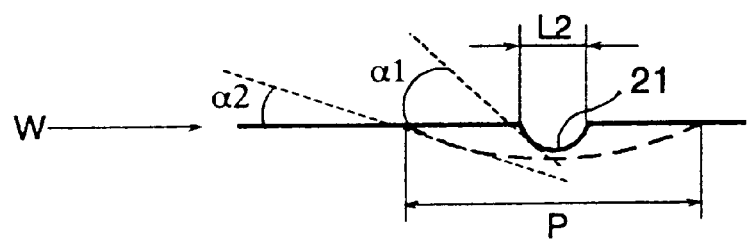
FIG. 20 is an illustration showing an effect of the width of a first bead on the initial maximum withstanding impact.

As shown in FIG. 20, since the width L2 of each concave or convex bead 21a or 21b of the first continuous bead 21 is smaller in the lengthwise direction than the crushing pitch P of each second bead 21, a bead inclination angle α1 of the bead 21a, 21b relative to the lengthwise direction is greater than a bead inclination angle α2 if a bead 21 has a width equal to the crushing pitch P, as a result of which the front side frame 1 is more easily collapsible at the first continuous bead 21 due to a longitudinal external impact W. This also provides significant reduction in withstanding impact force against an initial collapse due to a longitudinal external impact. For this reason, it is desired to provide the front side frame 1 with the first continuous bead 21 having a width in the longitudinal direction as small as possible.

Figure 21:
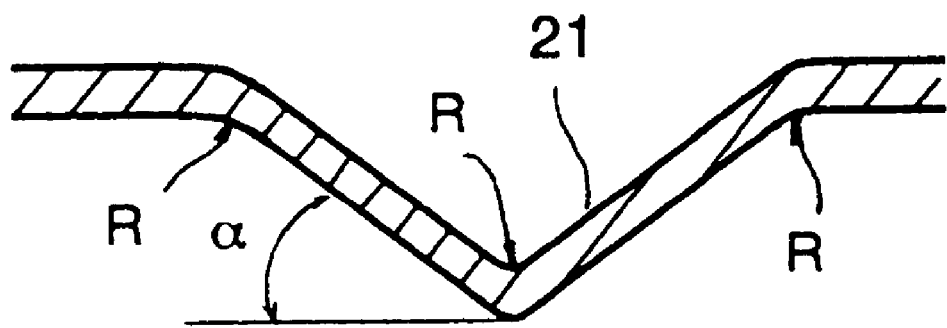
FIG. 21 is a cross-sectional view of a variation of the first bead.

First continuous bead 21 may be changed in shape to vary the withstanding impact force against an initial collapse. For example, as shown in FIG. 21, when the U-channel member 15, 16 of which the front side frame 1 is made has a uniform thickness, the front side frame 1 can provide high maximum withstanding external impact force against an initial collapse by increasing the radius of curvature R of the first continuous bead 21 with an effect of lowering stress concentration at the first continuous bead 21, or can provide low maximum withstanding external impact force against an initial collapse by decreasing the bead inclination angle α of the first continuous bead 21 which causes a longitudinal component of external impact force acting on the first continuous bead 21 in a direction perpendicular to the longitudinal direction to become lower. Further, because the first continuous bead 21 is comprised of alternations of the beads 21a and 21b which jut out from the wall sections in opposite directions and are the same in depth or height, while the front side frame 1 at the corners generates compressive stress due to forming the concave beads 21b and tensile stress due to forming the convex bead 21a, however, these stress at each corner are cancelled out each other. Accordingly, the first continuous bead 21 is prevented from breaking at the corner due to tension and swelling at the corner due to compression during forming these beads 21a and 21b, which is always desirable for a programmed collapse of the first continuous bead 21 as well as for sufficiently secured high average withstanding impact force against a collapse.

Front side frame 1 with an area where the bellows type of second beads 22 comprised of alternations of a ridge-shaped bead 22a and a groove-shaped bead 22b at crushing pitches P are provided regularly and securely collapses at the crushing pitches P in the lengthwise direction in a programmed fashion with a collapse of the first continuous bead 21 as a start when it is given a longitudinal external impact and is prevented from bending due to the longitudinal external impact. As a result, the front side frame 1 ensures higher average withstanding impact force against a collapse during collapsing and securely maintains higher withstanding impact force against a collapse. The second beads 21 are provided within an area defined between the upper and lower margins 15e, 16e of the side wall section 15d, 16d, they prevent the front side frame 1 from being collapsed at corners, so as to prevent a decrease in average withstanding impact force against a collapse of the front side frame 1 at the corners. The second beads 21 adjacent to the first continuous bead 21 in the longitudinal direction permits the front side frame 1 to collapse over the front frame part 18 in programmed fashion from the front toward the rear. The second beads 22 provided in the opposite side wall sections 15d and 16d cause the front side frame 1 to securely collapse bellows-fashion at regular pitches upon an occurrence of a collision.

Second beads 22, each of which is comprised of mating halves, a ridge-shaped dead section formed in one side wall section of the front side frame 1 and a groove-shaped bead formed in another side wall section of the front side wall 1, provides a more secure collapse in bellows-fashion of the front side frame upon an occurrence of a collision than the second beads formed in either one side wall section of the front side frame only. Further more, there is neither compression nor tension at corners of the front side frame 1 at the front continuous bead 21 because compressive stress and tensile stress generated at the corners due to forming the convex and concave beads 21a and 21b are cancelled out and accordingly, the front side frame is prevented from breaking or swelling at the corner of the first continuous bead 21 during forming these beads 21a and 21b. This makes it secure that the front side frame 1 collapses with a collapse of the first continuous bead 21 as a start upon an occurrence of a collision.

Second beads 22 provided within an area defined between the upper and lower margins 15e, each of which has a vertical height H approximately equal to a half of a crushing pitch P of the front side frame 1, prevent the comers from flowing to the second beads 22 during a collapse of the front side frame 1, which is always desirable for the second beads 22 to collapse in programmed fashion. This is because the distance of flow of the comer accompanying a collapse of the front side frame 1 at the crushing pitches P is at most a half of the crushing pitch P.

Figure 22:
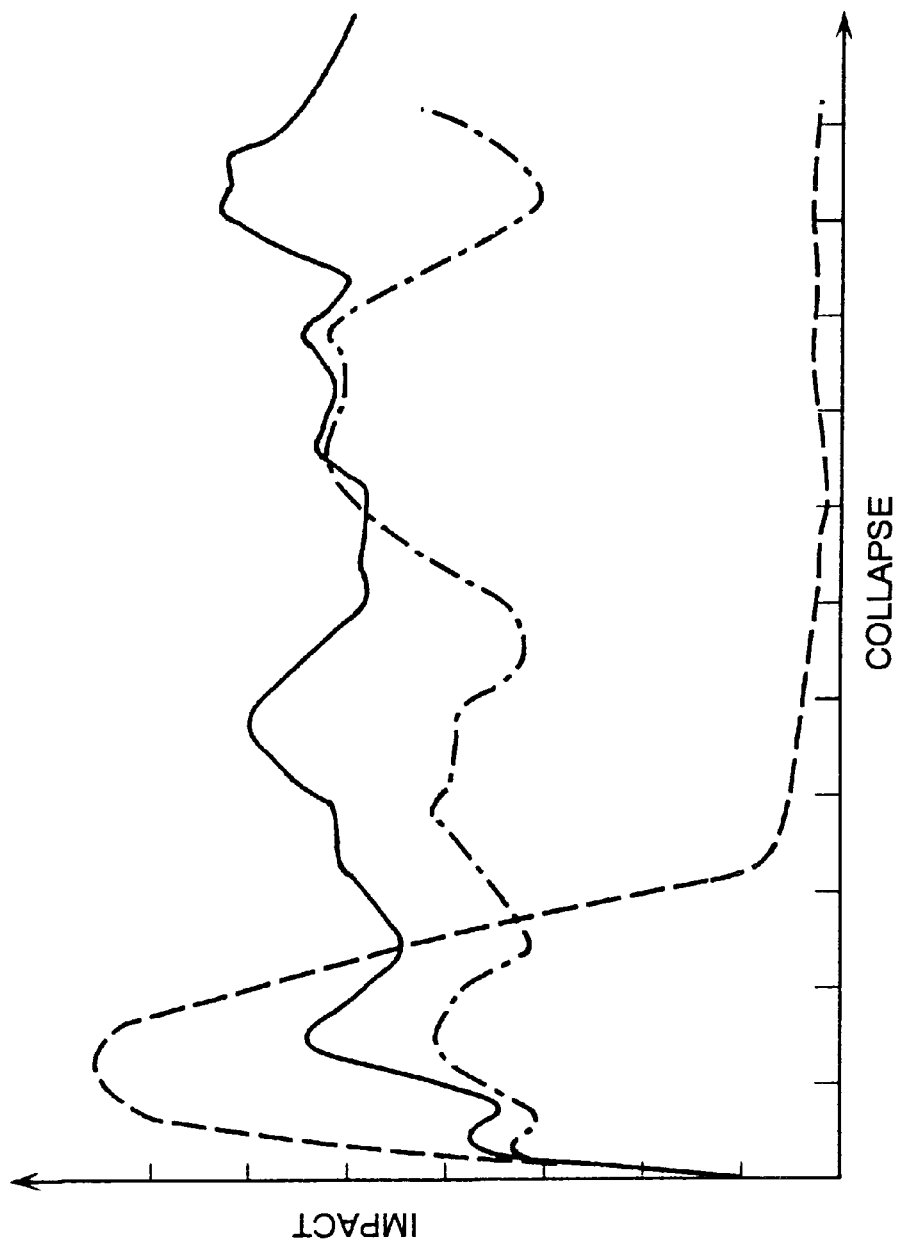
FIG. 22 is a graph of the relationship of an external impact against a front frame relative to a collapse.

In order to verify the effect of the first and second beads 21 and 22, a crushing test was conducted regarding a front side frame 1 shown in FIG. 11 and a prior art front side frame shown in, for example, Japanese Unexamined Utility Model Publication No. 2-24777. These two front side frames were prepared in the same dimensions and shape by using the same quality of members and parts. A result of the crushing test under the same condition was shown in FIG. 22. As revealed from the test result, the front side frame 1 with the first and second beads 21 and 22 has an increased average withstanding impact force against a collapse as well as a significantly reduced maximum withstanding impact force against an initial collapse as compared with the prior art front side frame. As shown by a broken line in FIG. 22, a frame which is not provided with any bead shows a considerably sharp increase in maximum withstanding impact force against an initial collapse and a significant decrease in average withstanding impact force which results from, for example, a bend of the frame.

Figure 23:
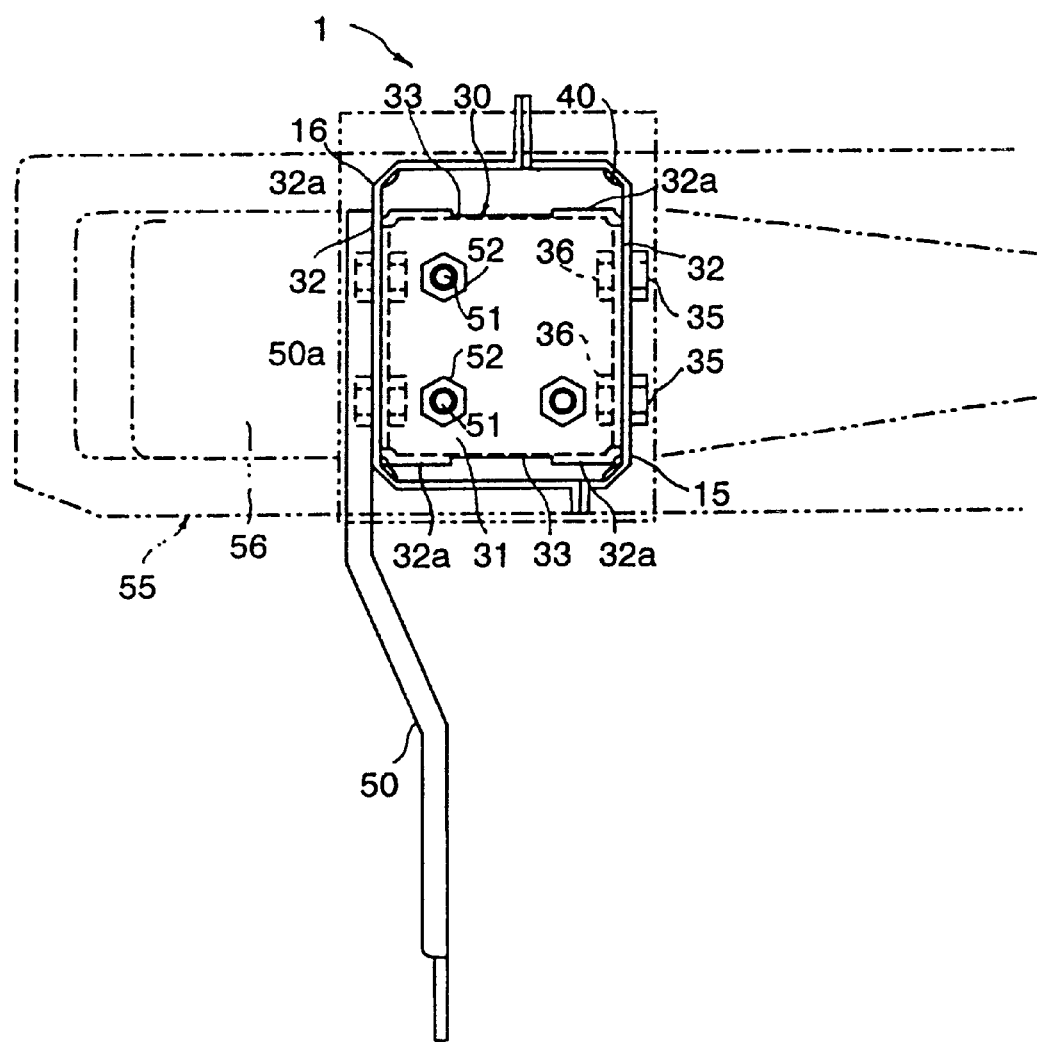
FIG. 23 is a front view of a structure for securing a front bumper to a front frame.
Figure 24:
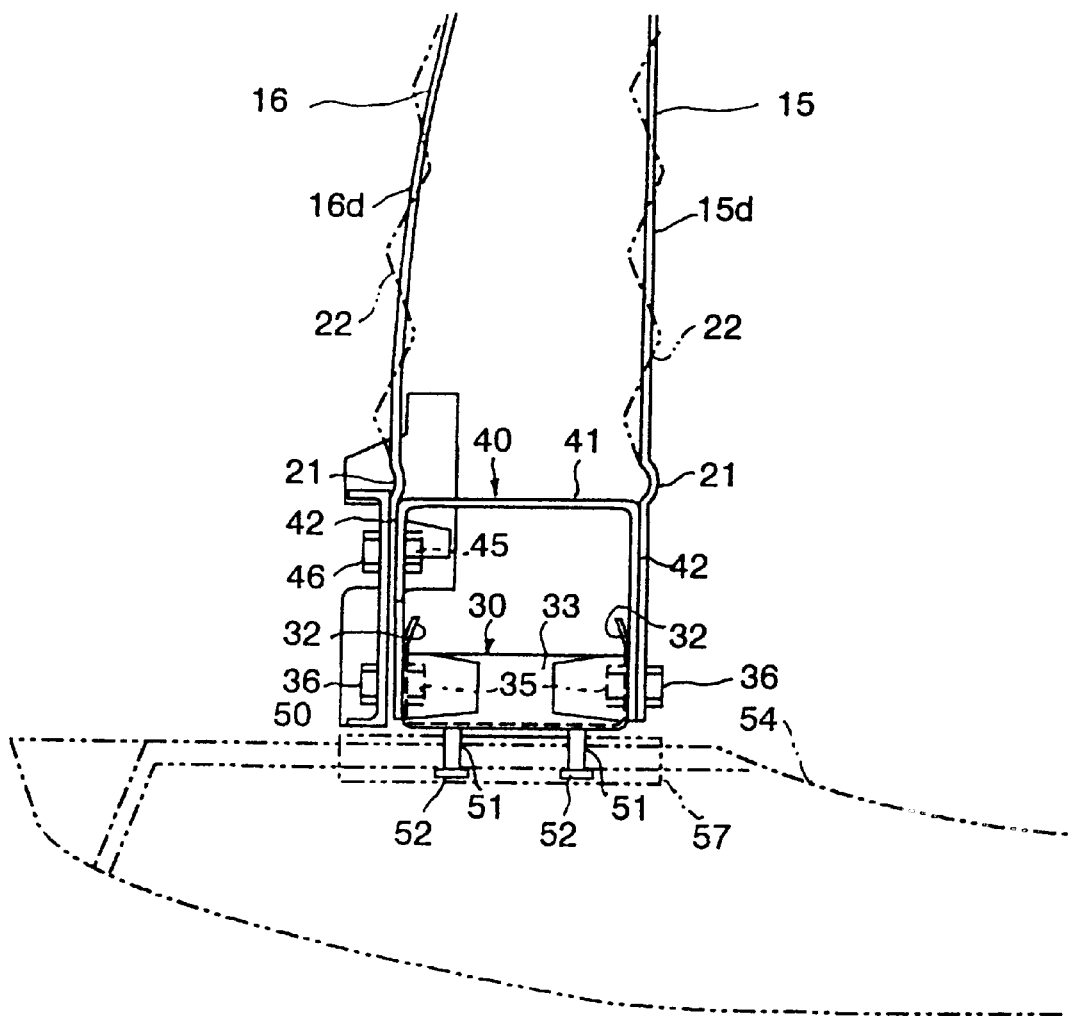
FIG. 24 is a top view of FIG. 23, in which the top of the front frame is removed.
Figure 25:
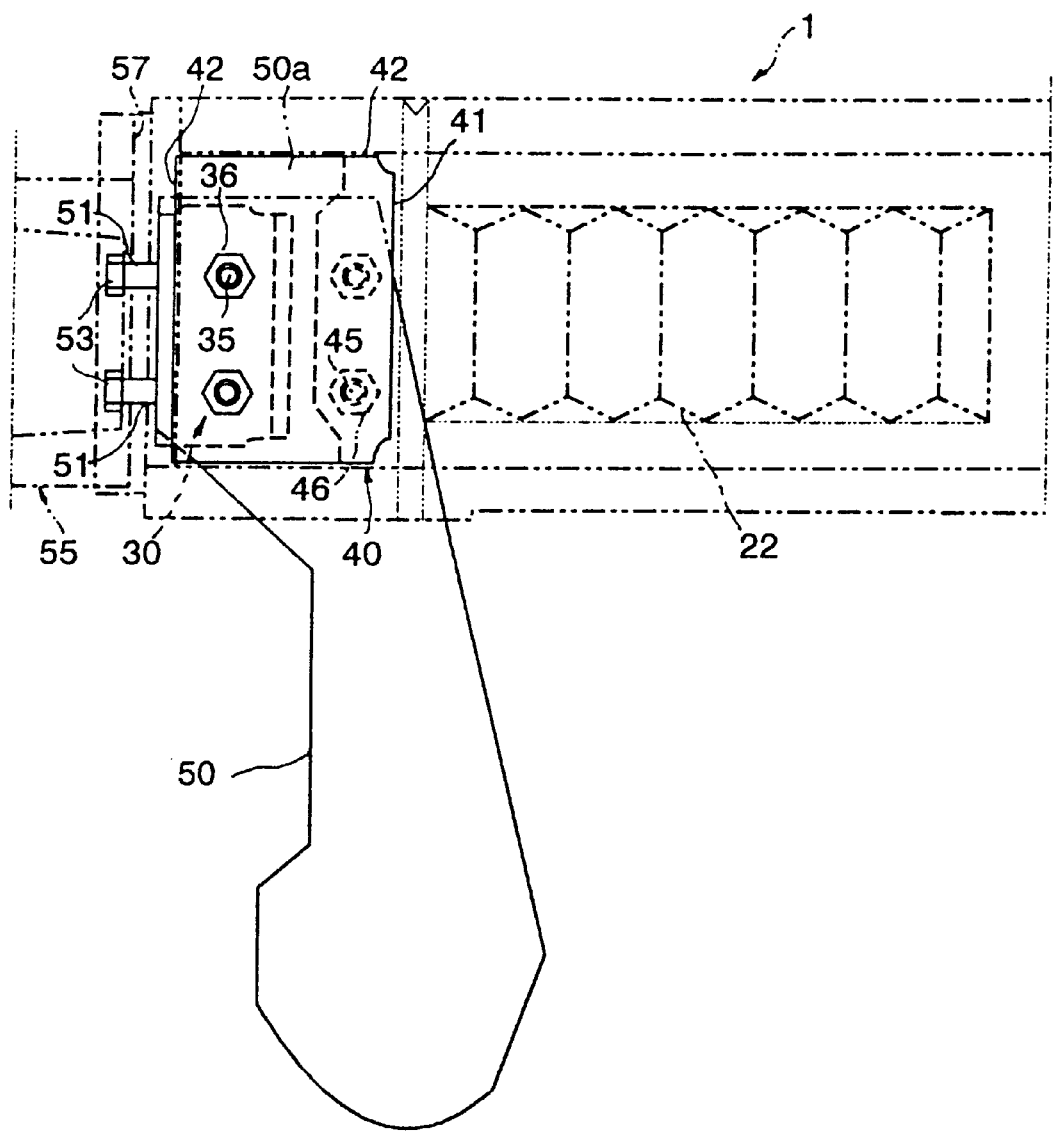
FIG. 25 is a side view of FIG. 23.

FIGS. 23 through 25 show a structure of securing the front reinforcement member 30 as a reinforcement to the front side frame 1. As shown, the front reinforcement member 30 has a rectangular box shape and comprises a partition wall section 31 and wall sections 32 and 33 bent back from the partition wall section 31 and has a width near the width of the cross section of the front side frame 1 and a height less than the height of the cross section of the front side frame 1. The end portion 32a of each side wall 32 is bent inward and overlaps with and is welded to the upper or lower wall 33 with an effect of increasing the stiffness of the front reinforcement member 30. The front reinforcement member 30 is fitted in the front side frame 1 with the partition wall section 31 slightly jutting forward from the front end of the front side frame 1 and the upper and lower walls 33 spaced apart from the front side frame 1. The side walls 32 are secured to the side wall sections 15d and 16d of the inner and outer U-channel members 15 and 16 by bolts 35 and nuts 36. That is, these front side frame 1 and front and rear reinforcement members 30 and 40 are integrated into a rigid structure by the bolts 35 and nuts 36.

Rear reinforcement member 40, which is disposed in close proximity to but before the first continuous bead 21 within the front side frame 1, comprises a partition wall section 41 and wall sections 42 and 43 bent forth from the partition wall section 41 and has a width equal to the width of the cross section of the front side frame 1 and a height less than the height of the cross section of the front side frame 1 but greater than the height of the front reinforcement member 30. One of the side wall sections 42, namely an inner side wall section, extends to the front end of the front side frame 1 and overlaps with the inner side wall section 32 of the front reinforcement member 30 and the side wall section 15d of the U-channel inner member 15. Another side wall sections 42, namely an outer side wall section, terminates behind the outer side wall section 32 of the front reinforcement member 30. The rear reinforcement member 30 is fitted in the front side frame 1 with the upper edge of the partition wall section 41 spaced apart from the front side frame 1. The inner side wall 42 is secured between the wall section 15d of the U-channel inner member 15 and the inner wall section 32 of the front reinforcement member 30 by the bolts 35 and nuts 36, and the outer side wall 42 is secured to the wall section 16d of the U-channel outer member 16 by bolts 45 and nuts 46. A hook 50 for anchoring the vehicle to, for example, a floor of a truck during transportation extends downward from the front side frame 1. The anchoring hook 50 has an attachment section 50a covering and secured to the front end portion before the first continuous bead 21 of the front side frame 1 by the bolts 35 and 45 and nuts 36 and 46. That is, these front side frame 1, front and rear reinforcement members 30 and 40 and anchoring hook 50 are integrated into a rigid structure by the bolts 35 and 45 and nuts 36 and 46.

Front reinforcement member 30 is provided with three fixing bolts 51 welded to and extending forward from the partition wall section 31. Two of these fixing bolts 51 are disposed closely to the side wall section 16e of the U-channel outer member 16 of the front side frame 1 and vertically spaced from each other. The third fixing bolts 51 is disposed closely to the side wall section 15d of the U-channel inner member 15 of the front side frame 1. A front bumper reinforcement 55 made of a resin material is fixed to the front reinforcement member 30. Specifically, the front bumper reinforcement 55 has a fitting wall section 56 with three bolt holes through which the fixing bolts 51 pass. Nuts 52 are fastened to the fixing bolts 51, respectively, to fix the fitting wall section 56, and hence the front bumper reinforcement 55, to the front reinforcement member 30. The front bumper reinforcement 55 is covered up by a bumper cover (not shown) supported at each end by a bracket 57.

With the front body structure shown in FIGS. 23 through 25, in the event of a frontal collision, the energy of an impact applied to the front bumper is transmitted to the front reinforcement member 30 through the front bumper reinforcement 55, as a result of which, almost all of the energy of the impact acting on the front bumper is transmitted to the front side frame 1 and collapses the second beads 22 in programmed fashion. In this way, the provision of the front reinforcement member 30 yields enhancement of average withstanding impact force of the front side frame 1 against a collapse. Further, due to the front body structure in which the front side frame 1 at the front end portion is strongly reinforced by the rear reinforcement member 40 disposed immediately before the second beads 22 and the front reinforcement member 40 overlapped and secured to the front end portion together with the rear reinforcement member 40, the front side frame 1 at the front end portion holds its cross section even when it receives the energy of an impact through the front bumper, as a result of which, the front side frame 1 is given sufficiently the energy of the impact to securely collapse at the first continuous bead 21. In this way, the front body structure makes it secure that the first continuous bead 21 performs the faction to decrease the maximum withstanding impact force of the front side frame 1 against an initial collapse just as designed. While the rear reinforcement member 40 is disposed as closely to the first continuous bead 21 as possible, the front reinforcement member 30 can be disposed in a relatively unrestricted position with an effect of providing variations of the structure of fixing the front bumper.

Figure 26:
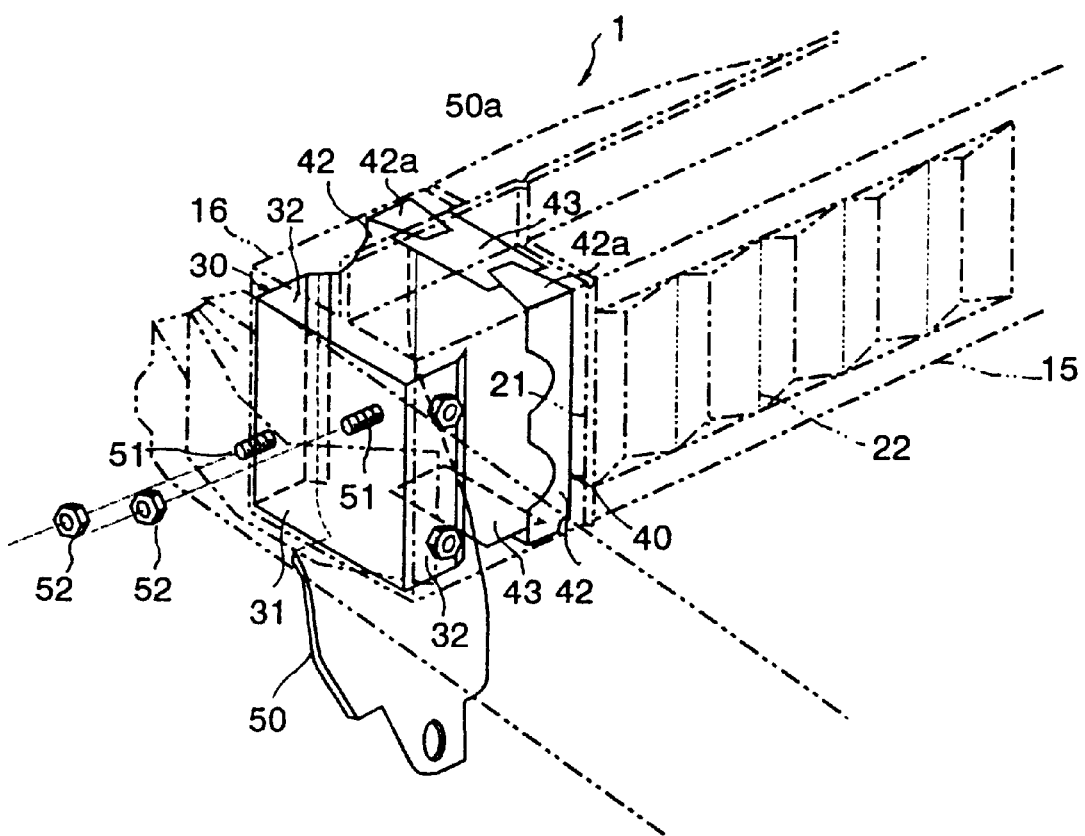
FIG. 26 is a perspective view of a front body structure in accordance with another embodiment of the invention.

FIG. 26 shows a variation of the front body structure having a front bumper fixing structure.

As shown, a front reinforcement member 30 disposed within the front side frame 1 comprises a partition wall section 31 and side wall sections 32 bent back from the partition wall section 31 and has a width near the width of the cross section of the front side frame 1. The side walls 32 are secured to the side wall sections 15d and 16d of U-channel members 15 and 16 by bolts and nuts (only nuts 36 are shown). The front reinforcement member 30 is provided with two fixing bolts 51 welded to and extending forward from the partition wall section 31. Nuts 52 are fastened to the fixing bolts 51, respectively, to fix a front bumper to the front reinforcement member 30.

A rear reinforcement member 40, which is disposed in close proximity to but before the first continuous bead 21 within the front side frame 1, comprises a partition wall section 41 and wall sections 42 and 43 bent forth from the partition wall section 41. The end portion 42a of each side wall 42 is bent inward and overlaps with and is welded to the upper or lower wall 43 with an effect of increasing the stiffness of the rear reinforcement member 40. An anchoring hook 50 extends downward from the front side frame 1. The anchoring hook 50 at its attachment section 50a is secured to the front end portion before the first continuous bead 21 of the front side frame 1 together with the outer side wall section 42 by bolts and nuts (not shown). The attachment section 50a of the anchoring hook 50 covers a half of the front end area of the front side frame 1 before the first continuous bead 21 to overlap indirectly the outer side wall section 42 of the rear reinforcement member 30 only. The inner side wall section 42 of the rear reinforcement member 30 is welded to the side wall section 15d of the U-channel inner member 15.

With the front body structure shown in FIG. 26, in the event of a frontal collision, the energy of an impact applied to the front bumper is transmitted to the front side frame 1 through the front reinforcement member 30, as a result of which, the front body structure yields enhancement of average withstanding impact force of the front side frame 1 against a collapse due to the second beads 22 as well as causing the front side frame 1 at the first continuous bead 21 to collapse in programmed fashion with a decreased maximum withstanding impact force against an initial collapse. Further, the front reinforcement member 30 can be disposed in a relatively unrestricted position with an effect of providing variations of the structure of fixing the front bumper.

Figure 27:
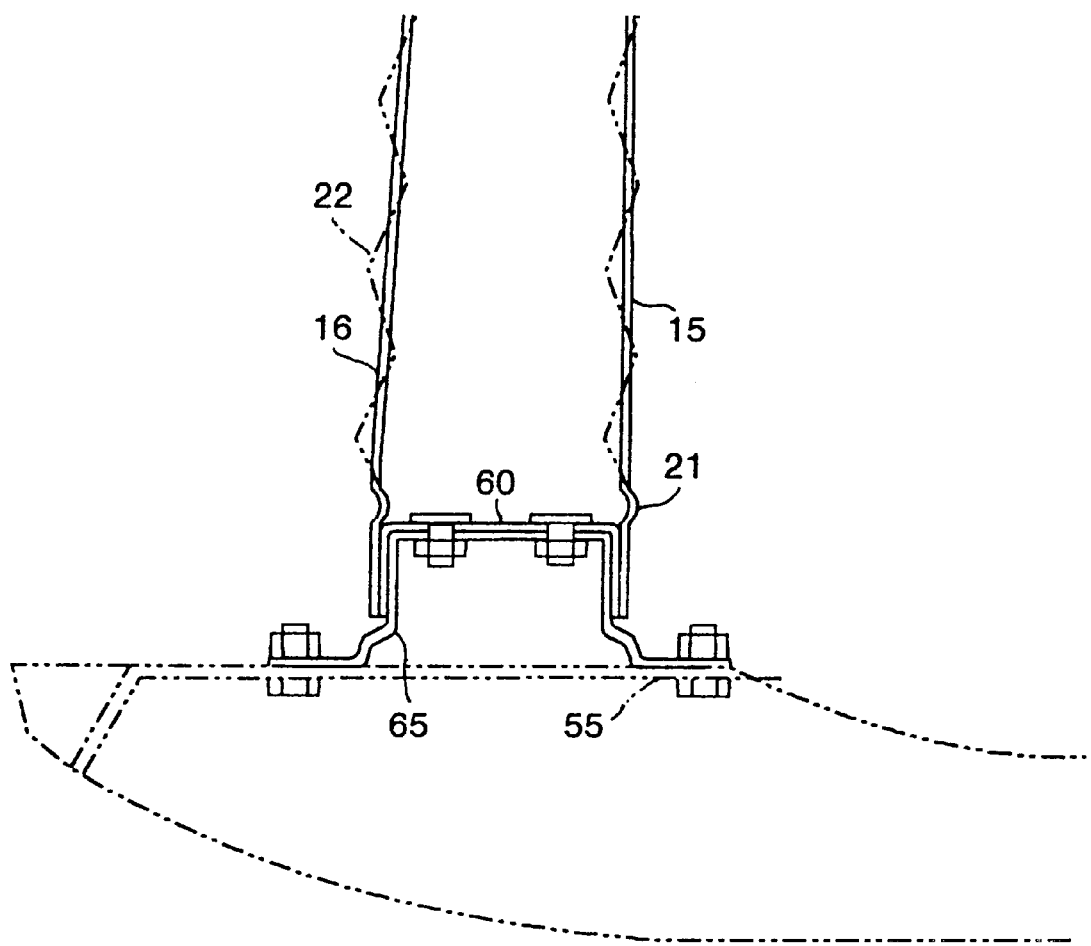
FIG. 27 is a top view of a variation of the structure for securing a front bumper to a front frame, in which the top of the front frame is removed.

FIG. 27 shows a further variation of the front body structure having a front bumper fixing structure in which a generally U-shaped reinforcement member 60 is used. As shown, the U-shaped reinforcement member 60 is welded to both side wall sections 15d and 16d of the U-channel members 15 and 16 immediately before a first continuous bead 21. A fitting bracket 65 bolted to a front bumper reinforcement 55 is bolted to the U-shaped reinforcement member 60.

With the front body structure shown in FIG. 27, in the event of a frontal collision, the energy of an impact applied to the front bumper is directly and securely transmitted to the front side frame 1 at the first continuous bead 21 through the reinforcement member 60, so that the front body structure causes the front side frame 1 at the first continuous bead 21 to collapse in programmed fashion with a decreased maximum withstanding impact force against an initial collapse.

Figure 28:
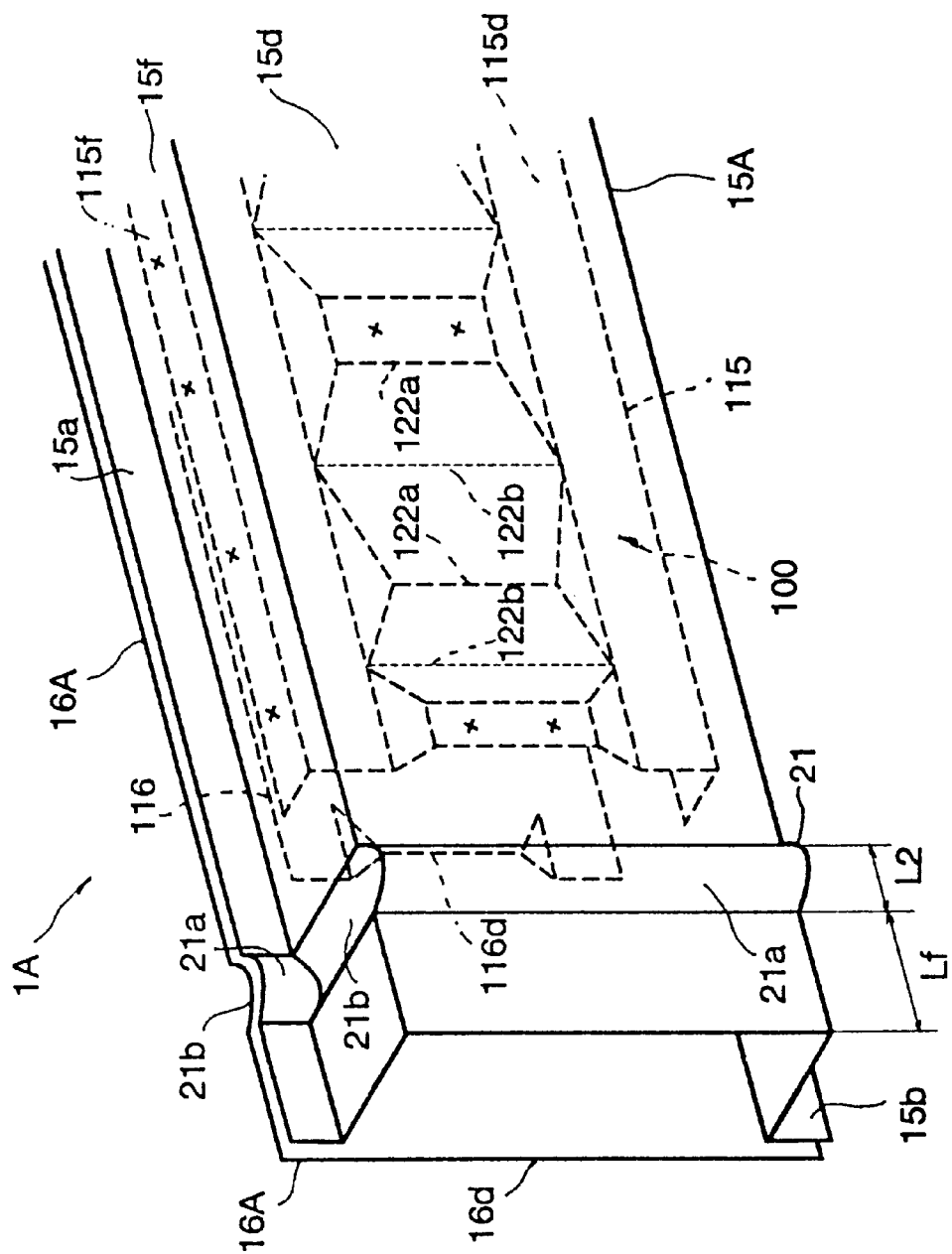
FIG. 28 is a perspective view of a front side frame of a front body structure in accordance with another embodiment of the invention.

FIG. 28 shows the front body structure having a front side frame 1A of a boxed U-channel type in which a crushable reinforcement frame 100 is installed.

As shown in FIG. 28, the front side frame 1A, which is comprised of an flanged U-channel inner member 15A and a flat plate outer member 16A welded to flanges 15a and 15b, is formed with a first continuous bead 21 disposed near the front end thereof. The first continuous bead 21 is comprised of ridge-shaped beads 21a and groove beads 21b formed in the wall sections of the U-channel inner member 15 and the flat outer member 16.

Crushable reinforcement frame 100 comprised of a generally U-channeled members 115 and 116 extends in the lengthwise direction within the front side frame 1 after the first continuous bead 21. The U-channeled members 115 and 116 are provided with a plurality of second beads 122 arranged in the lengthwise direction. Specifically, the second beads 122 are comprised of alternations of a ridge-shaped bead 122a and a groove-shaped bead 122b formed in a vertical side wall section 115d, 116d of each member 115, 116, and each second bead 22 is comprised of mating halves, namely a ridge-shaped bead 122a in one U-channel member and a groove-shaped bead 122b in another U-channel member. Upper and under wall sections 115f of the U-channel inner member 115 are welded to the upper and lower wall sections 15f of the U-channel inner member 15A. Similarly, upper and under wall sections 116f of the U-channel outer member 116 are welded to the outer member 16A. This bead structure in bellows fashion is programmed to collapse the crushable reinforcement frame 100 in the lengthwise direction with a collapse of the first continuous bead 21 as a start upon an occurrence of a frontal collision. The collapse of the crushable reinforcement frame 100 causes the front side frame 1A to securely and uniformly collapse in programmed fashion, so as thereby to absorb the energy of an impact upon an occurrence of a frontal collision. The installation of the crushable reinforcement frame 100 provided with the second beads 22 yields enhancement of average withstanding impact force of the front side frame 1A against a collapse.

Front body structure may include an apron panel above the front side frames 1, 1A and/or a lower panel under the front side frames 1, 1A which is provided with beads similar to the first and second beads 21 and 22 with an effect of making a collapse of the front side frame 1, 1A in programmed fashion more secure. Further, the front side frame 1, 1A may be provided with front and rear reinforcement members 30 and 40 disposed within and secured to a bracket like one 65 shown in FIG. 27 secured to the front side frame 1. In such a structure, a front bumper is connected directly to the front reinforcement member 30. Further, in such a structure, the bracket may be provided with the first continuous beam 21 or both first and second beads 21 and 22. The bumper fitting structure described above can be employed to connect a rear bumper to a rear body structure.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A front body structure for a vehicle, which has a boxed-type front frame extending in a lengthwise direction from the front to the back of the vehicle and forming part of each side of a front body of the vehicle, said front frame characterized by an improvement that said front frame has a height substantially constant from a rear end thereof toward a forward end thereof and a width increasing as said front frame comes closer toward said forward end and a closed rectangular cross section having a height-to-width ratio decreasing toward a ratio of one as said front frame comes closer to said forward end thereof.

2. The front body structure as defined in claim 1, wherein said front frame has front impact absorbing means disposed near said forward end for relieving a longitudinal impact applied to a forward end of said front frame and rear reinforcing means disposed in rear part of said front frame for preventing a bend of said front frame due to said longitudinal impact.

3. The front body structure as defined in claim 2, wherein said front frame has a section at a rear part thereof which is bent rearward down and said rear reinforcing means comprises a gusset disposed along said section.

4. The front body structure as defined in claim 2, wherein said front impact absorbing means comprises a continuous bead surround entire wall sections of said front frame, said continuous bead comprising a ridge-shaped bead formed in each of opposite wall sections of said front frame and a groove-shaped bead formed in each of another opposite wall sections of said front frame.

5. A front body structure as defined in claim 4 wherein said front frame has a rigid reinforcement member which is disposed an interior of said front frame before said continuous bead and through which a front bumper is securely mounted on said rigid reinforcement member.

6. The front body structure as defined in claim 5, wherein said rigid reinforcement member is disposed in close proximity to said continuous bead.

7. The front body structure as defined in claim 5, wherein said front frame has rear impact absorbing means provided in each vertical wall section behind said front impact absorbing means and between upper and lower margins of said each vertical wall section of said front frame for providing an improvement of average withstanding longitudinal impact force against a collapse, said rear impact absorbing means comprising alternations of a ridge-shaped bead and a groove-shaped bead arranged at specified crushing pitches in said lengthwise direction.

8. A front body structure for a vehicle, which has a boxed-type of front frame extending in a lengthwise direction from the front to the back of the vehicle and forming part of each side of a front body of the vehicle, said front body structure comprising:

first bead means for shoring impact force due to a collapse of said front frame, said first bead means comprising a ridge-shaped bead formed in each of opposite wall sections of said front frame and a groove-shaped bead formed in each of another opposite wall sections of said front frame; and rigid reinforcement means having a front bumper mount and disposed before said first bead means in said lengthwise direction of the vehicle for mounting a front bumper to said front bumper mount.

9. The front body structure as defined in claim 8, wherein said rigid reinforcement means is disposed in close proximity to said first bead means.

10. The front body structure as defined in claim 8, wherein said front bumper is secured to said rigid reinforcement means by bolts fixed to said rigid reinforcement means and nuts fastened to said bolts.

11. The front body structure as defined in claim 8, wherein said rigid reinforcement means comprises two rigid reinforcement members separated in said lengthwise direction, one of said two rigid reinforcement members being disposed in close proximity to said first bead means and another of said two rigid reinforcement members being disposed before said one rigid reinforcement member and provided with bolts secured thereto for securing said front bumper.

12. The front body structure as defined in claim 8, wherein said first bead means surrounds continuously entire wall sections of said front frame.

13. The front body structure as defined in claim 8, wherein said first bead means comprises a ride-shaped bead and a groove-shaped bead formed in adjacent wall sections of said front frame, respectively, said ridge-shaped bead having a height approximately equal to a depth of said groove-shaped bead.

14. The front body structure as defined in claim 8, wherein said front frame has second bead means provided in at least one of said vertical wall sections behind said first bead means and between upper and lower margins of said one vertical wall section of said front frame for providing an improvement of average withstanding longitudinal impact force against a collapse, said second bead means comprising alternations of a ridge-shaped bead and a groove-shaped bead arranged at specified crushing pitches in said lengthwise direction.

15. The front body structure as defined in claim 14, wherein said ridge-shaped beam and said groove-shaped bead of said first bead means has a width in said lengthwise direction less than a half of said specified crushing pitch.

16. The front body structure as defined in claim 14, wherein said second bead means is directly adjacent to said first bead means.

17. The front body structure as defined in claim 14, wherein said second bead means is separated by an integral multiple of said specified crushing pitch from said first bead means.

18. The front body structure as defined in claim 14, wherein said second bead means is formed within an extent of a vertical height between said upper and lower margins with subtraction of approximately a half of said specified crushing pitch of the front frame.

19. The front body structure as defined in claim 14, wherein said second bead means are provided in both said vertical wall sections of said front frame.

20. The front body structure as defined in claim 19, wherein said second bead means comprises a ridge-shaped bead formed in one of said vertical wall sections and a groove-shaped bead formed in another one of said vertical wall sections.

21. A front body structure for a vehicle comprising:

a boxed-type of front frame extending in a lengthwise direction from the front to the back of the vehicle and forming part of each side of a front body of the vehicle and having a closed rectangular cross section having a height-to-width ratio decreasing toward a ratio of one as said front frame comes closer to a forward end thereof;

a first continuous bead provided in said front frame close to said forward end and surrounding entire wall sections of said front frame;

a crushable reinforcement member disposed in and secured to said front frame, said crushable reinforcement member being provided with a second bead arrangement comprising alternations of a ridge-shaped bead and a groove-shaped bead arranged at specified crushing pitches in said lengthwise direction.

* * * * *